United States Patent
Cooke et al.

(10) Patent No.: US 9,802,705 B2
(45) Date of Patent: Oct. 31, 2017

(54) AIRCRAFT PASSENGER SEAT FIXING SYSTEMS AND ARRANGEMENTS

(71) Applicant: BRITISH AIRWAYS PLC, West Drayton (GB)

(72) Inventors: Peter Cooke, Ditchling (GB); Paul Grader, London (GB)

(73) Assignee: BRITISH AIRWAYS PLC, Harmondsworth, West Drayton (GB)

( * ) Notice: Subject to any disclaimer, the term of this patent is extended or adjusted under 35 U.S.C. 154(b) by 0 days.

(21) Appl. No.: 14/763,475

(22) PCT Filed: Jul. 18, 2014

(86) PCT No.: PCT/GB2014/052195
§ 371 (c)(1),
(2) Date: Jul. 24, 2015

(87) PCT Pub. No.: WO2015/008082
PCT Pub. Date: Jan. 22, 2015

(65) Prior Publication Data
US 2016/0122022 A1 May 5, 2016

(30) Foreign Application Priority Data
Jul. 19, 2013 (GB) .................................. 1312972.1
Feb. 12, 2014 (GB) .................................. 1402458.2

(51) Int. Cl.
*B64D 13/00* (2006.01)
*B64D 11/06* (2006.01)
(Continued)

(52) U.S. Cl.
CPC ............ *B64D 11/0601* (2014.12); *B64C 1/18* (2013.01); *B64C 1/20* (2013.01); *B64D 11/0605* (2014.12);
(Continued)

(58) Field of Classification Search
CPC ... B64D 11/601; B64D 11/602; B64D 11/604; B64D 11/605; B64D 11/606; B64D 11/639; B64D 11/641; B64D 11/643
(Continued)

(56) References Cited

U.S. PATENT DOCUMENTS 7,025,306 B2   4/2006  Saint Jalmes
7,178,871 B1*  2/2007  Round ................... B60N 2/242
                                                  297/217.3
(Continued)

FOREIGN PATENT DOCUMENTS

WO    WO 00/21831       4/2000
WO    WO 2007/003889 A1  1/2007
(Continued)

OTHER PUBLICATIONS

Search Results under Rule 164(2)(b) EPC, for European Application No. EP 14753111, dated May 18, 2016 (2 pages).
(Continued)

*Primary Examiner* — Richard G Davis
(74) *Attorney, Agent, or Firm* — Sterne, Kessler, Goldstein & Fox P.L.L.C.

(57) ABSTRACT

An aircraft passenger seating system comprises an array of floor panels (4) fixed within an aircraft cabin deck section (1), the floor panels (4) providing an array of discrete fixing means for removable attachment of a plurality of passenger seating units. The seating units may be of mutually different configurations each having a common footprint, such that the different configurations are interchangeable without having to re-arrange other seating units. The common footprint may be provided by a common size and shape of floor panel (4) or the floor panels (4) may provide a regular array of discrete fixing means such that the configurations may be positioned regardless of the position of the floor panels (4).

12 Claims, 32 Drawing Sheets

(51) Int. Cl.
*B64C 1/18* (2006.01)
*B64C 1/20* (2006.01)

(52) U.S. Cl.
CPC ...... *B64D 11/0606* (2014.12); *B64D 11/0641* (2014.12); *B64D 11/0643* (2014.12); *B64D 11/0696* (2013.01)

(58) Field of Classification Search
USPC ..................................................... 244/118.6
See application file for complete search history.

(56) References Cited

U.S. PATENT DOCUMENTS

| | | | |
|---|---|---|---|
| 7,607,612 | B2 | 10/2009 | Baatz et al. |
| 2003/0143052 | A1 | 7/2003 | Fehrle et al. |
| 2003/0218095 | A1* | 11/2003 | Saint Jalmes .......... B64D 11/00 244/118.5 |
| 2009/0050740 | A1 | 2/2009 | Saint-Jalmes et al. |
| 2010/0314494 | A1 | 12/2010 | Gasser et al. |
| 2012/0223186 | A1 | 9/2012 | Henshaw |
| 2012/0298798 | A1 | 11/2012 | Henshaw et al. |
| 2012/0318918 | A1 | 12/2012 | Johnson et al. |
| 2013/0248655 | A1* | 9/2013 | Kroll ...................... B64D 11/06 244/118.6 |
| 2014/0361585 | A1* | 12/2014 | Henshaw ................. B60N 2/01 297/174 R |
| 2016/0052633 | A1* | 2/2016 | Lawson ................. B64D 11/00 244/118.6 |

FOREIGN PATENT DOCUMENTS

| | | |
|---|---|---|
| WO | 2007072045 A2 | 6/2007 |
| WO | WO 2009/013445 A1 | 1/2009 |
| WO | WO 2009/120308 A2 | 10/2009 |
| WO | WO 2010/131014 A1 | 11/2010 |
| WO | WO 2011/119720 A2 | 9/2011 |

OTHER PUBLICATIONS

International Search Report based on PCT/GB2014/052195 mailed on Mar. 5, 2015 (6 pages).

* cited by examiner

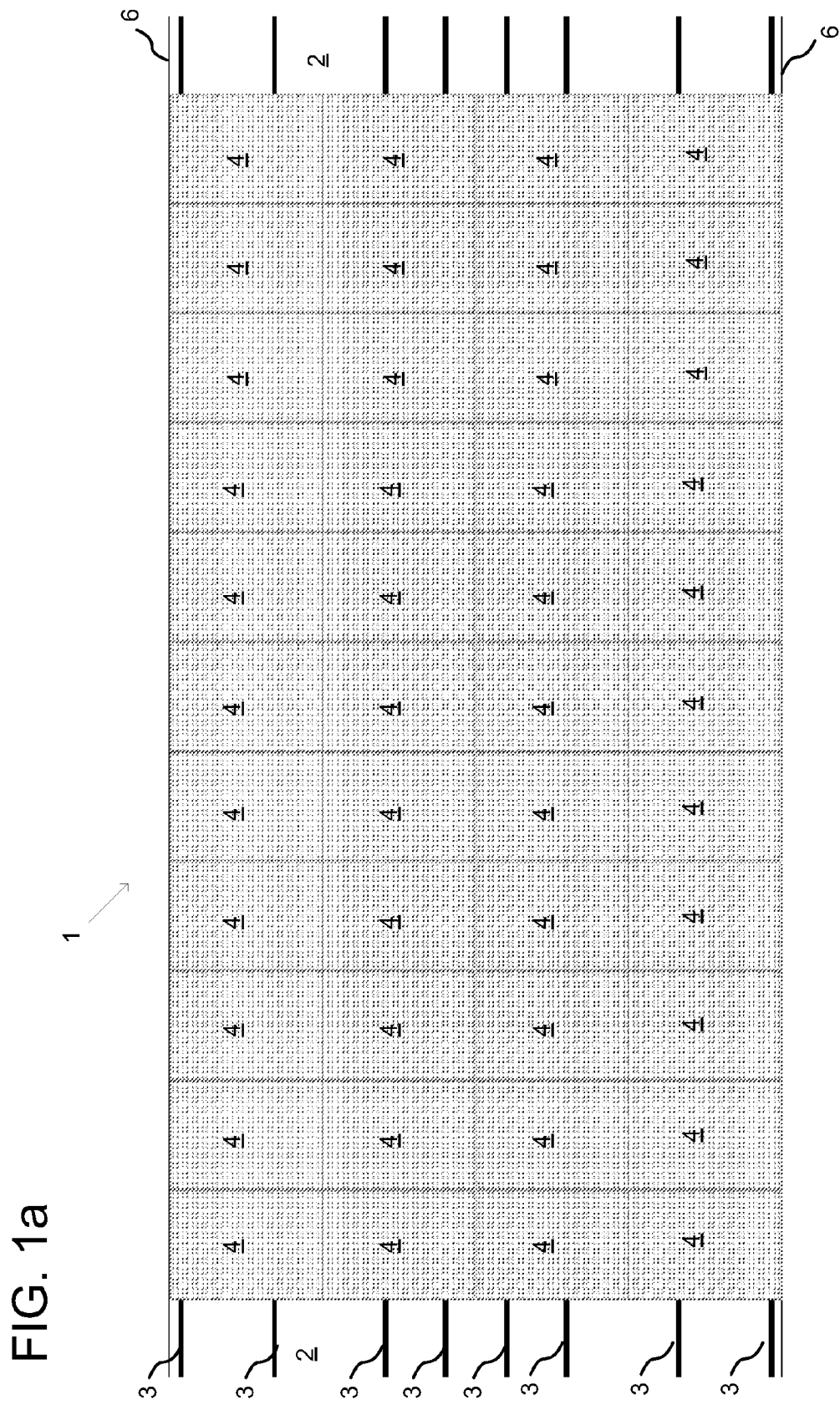

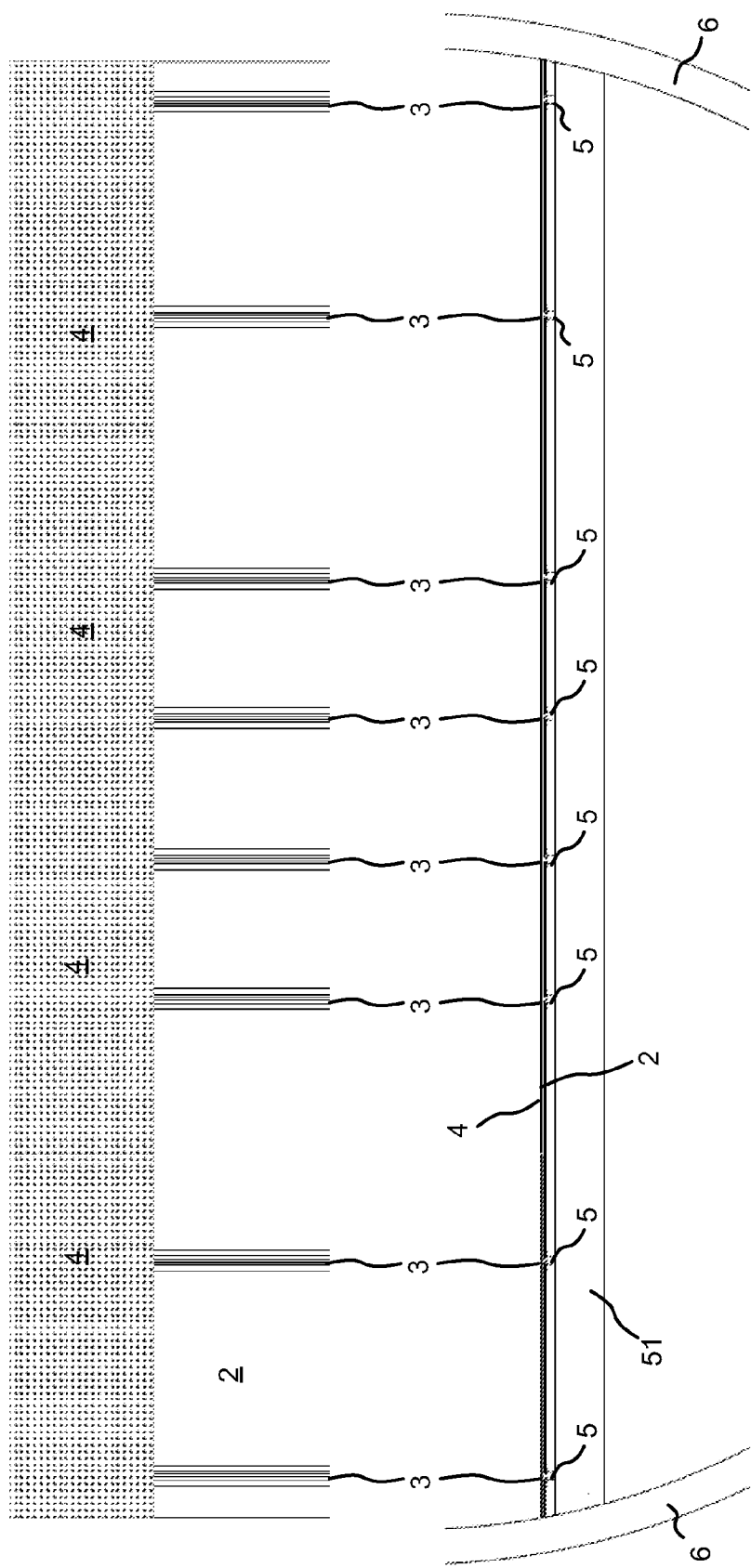

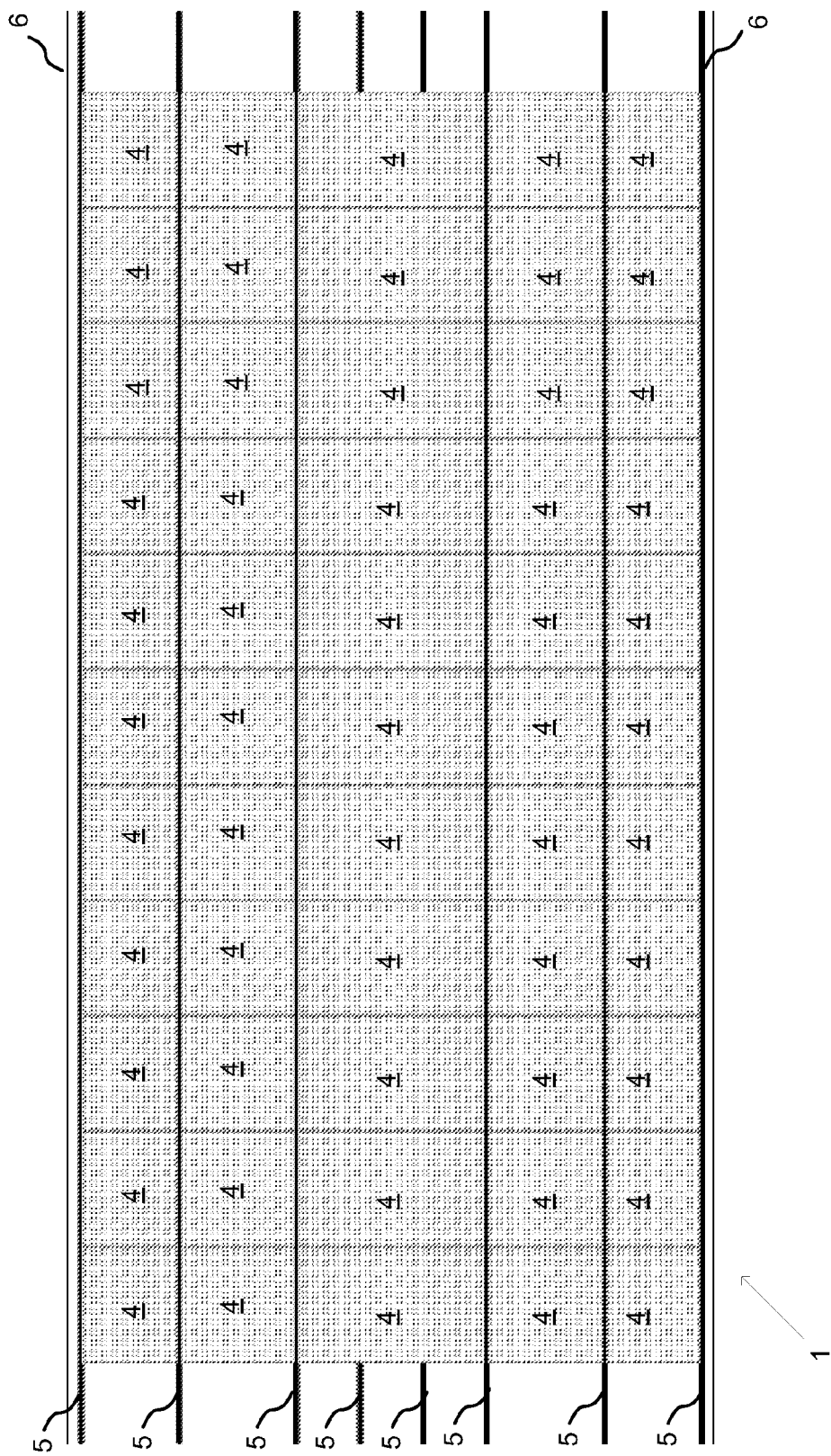

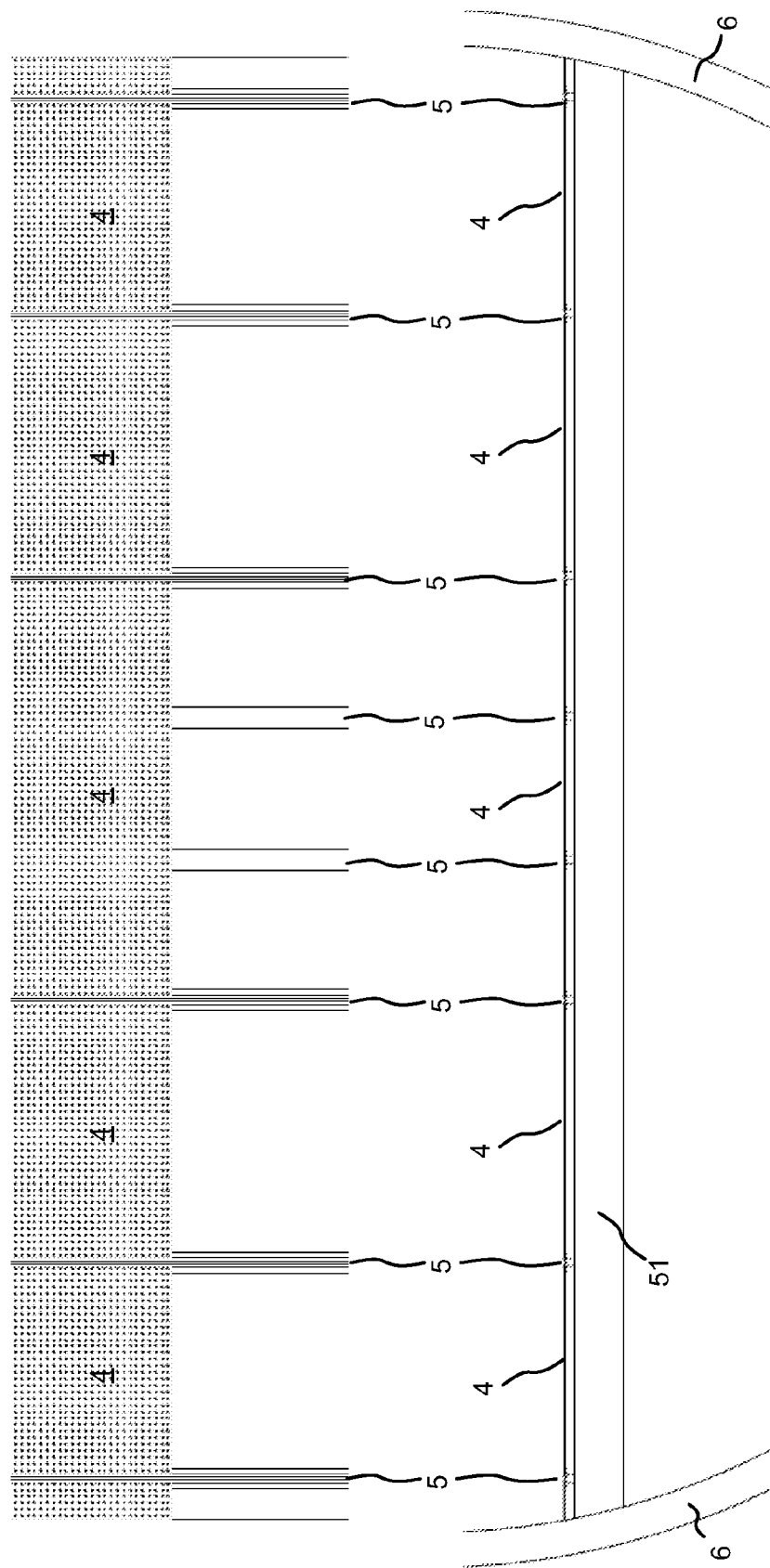

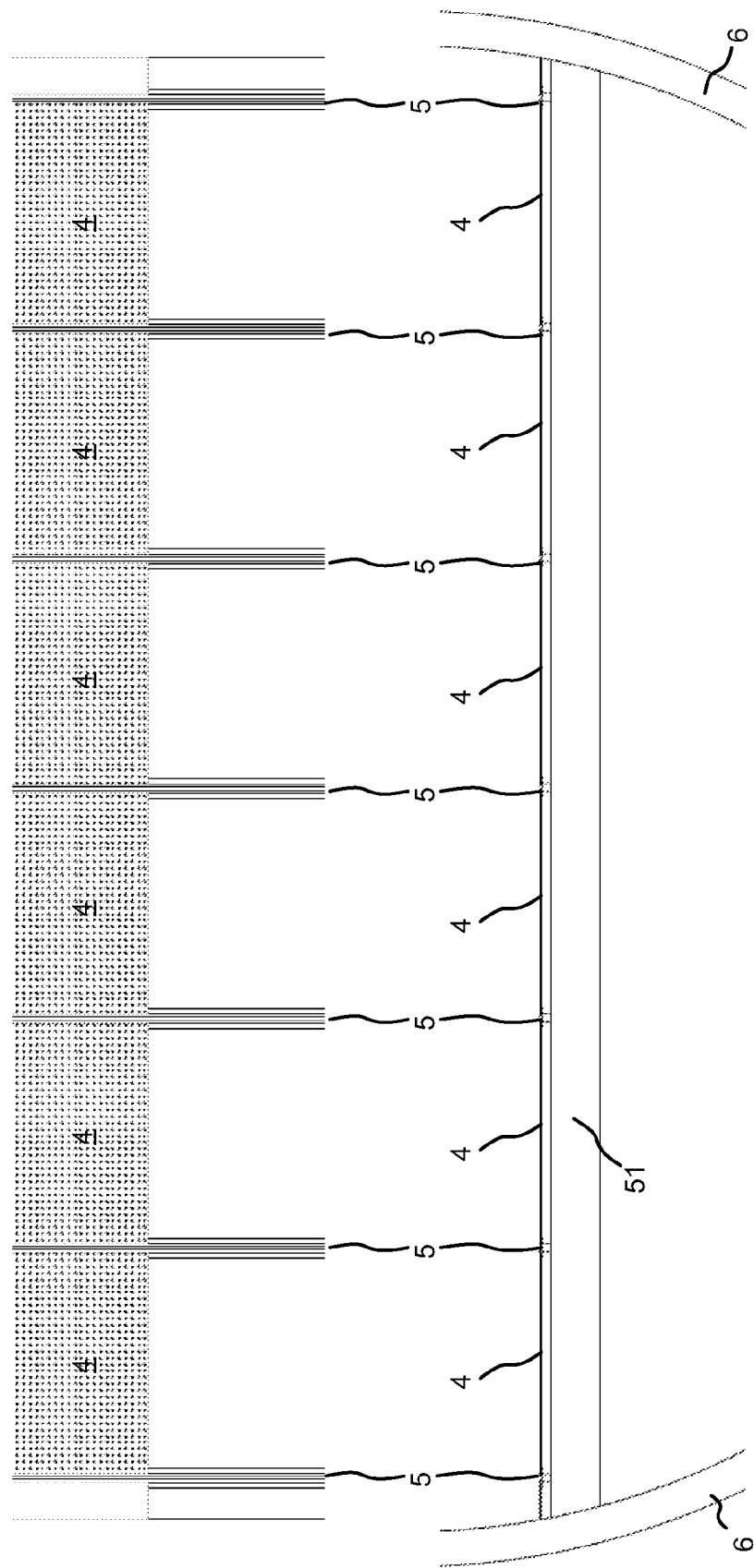

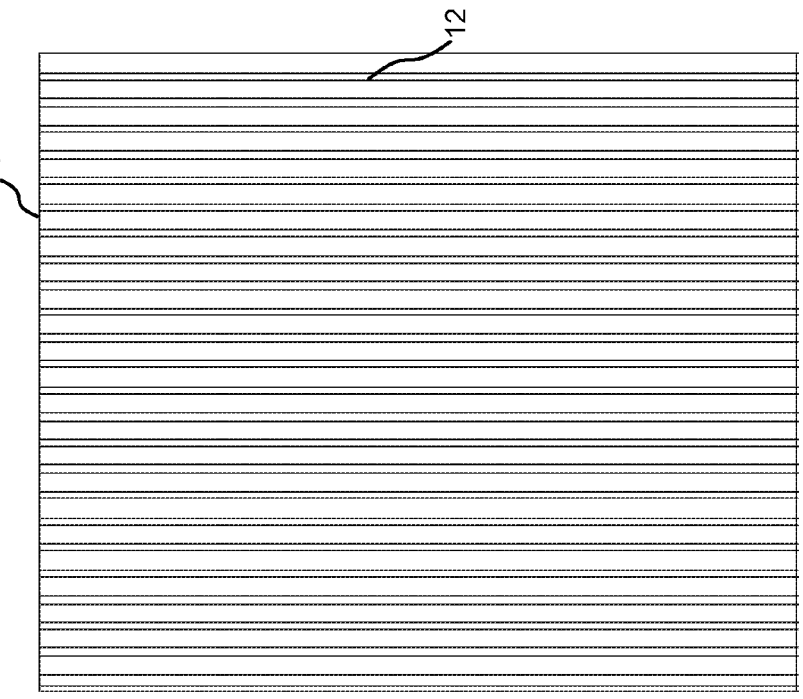
FIG. 8a  FIG. 8b
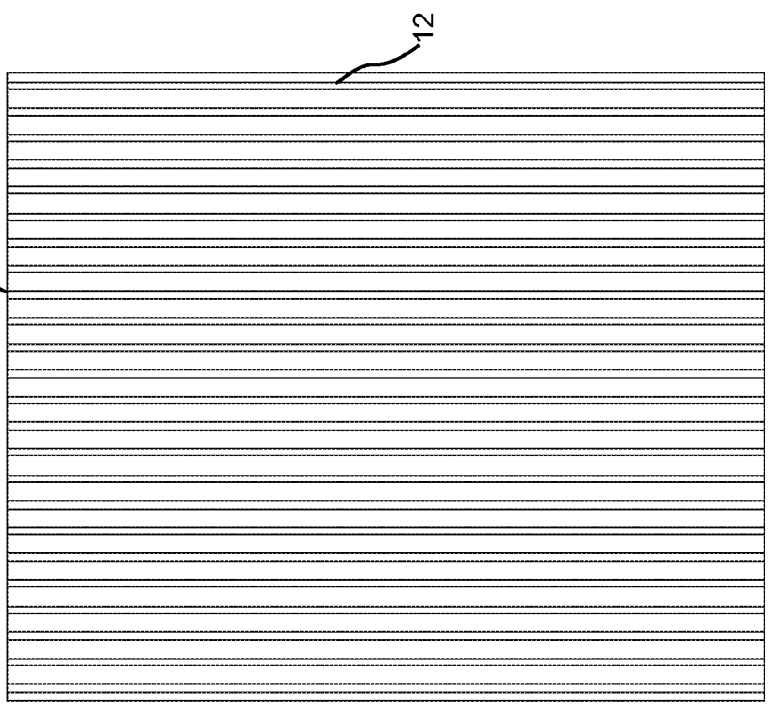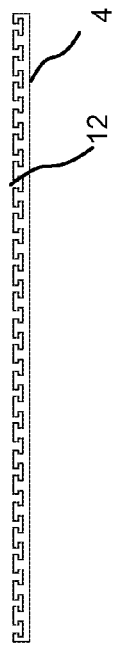
FIG. 7a  FIG. 7b

AIRCRAFT PASSENGER SEAT FIXING SYSTEMS AND ARRANGEMENTS

One aspect of the present invention relates to an aircraft passenger seat fixing system, and particularly to a system allowing flexible configuration of passenger seating units within an aircraft cabin section. Another aspect relates to such configurations.

BACKGROUND TO THE INVENTION

Conventionally, passenger aircraft are supplied by the aircraft manufacturer with the floor panels of the passenger deck(s) already in place, fixed to the internal structure of the aircraft; this internal structure typically comprises a series of regularly spaced laterally extending joists and longitudinally extending beams to which the floor panels are bolted, the joists being attached to circumferential, longitudinally spaced ribs forming part of the aircraft fuselage and the longitudinally extending beams being attached to the joists. The beams carry longitudinally extending fixing tracks of a standard type, onto which passenger seats and seating components may be fitted. These tracks provide a degree of flexibility in seat pitch i.e. the spacing of seats in the longitudinal direction of the cabin, and allow individual seats or rows of seats to be removed and replaced. However, the lateral alignment of the seats is constrained by the tracks.

Another conventional approach is to mount seats or seating components integrally on a 'pallet', which is attached to the fixing tracks in the floor panels. This approach has been used for example in the applicant's 'Club World'® seats, aspects of which are described in WO-A-2000/21831. This approach removes the need for seats or seating components to be compatible with the standard fixing tracks, but does not allow the parts to be easily reconfigured within the cabin. Also, the pallet adds to the overall weight of the seating.

Patent publication WO-A-2011/119720 discloses a floor panel system with fixing tracks different from the standard fixing tracks, to allow more variation in the design of seat frames. The floor panels may replace standard floor panels, or be attached to existing standard floor panels.

Conventional aircraft passenger seat layouts require different cabin classes to be segregated, typically in longitudinal blocks on the same deck, or on different decks. Each block typically comprises seats of the same type. However, this is unduly limiting and provides a suboptimal experience for many passengers. For example, a row of seats that may be satisfactory for passengers travelling alone or in pairs may be less suitable for families or larger groups of passengers. One business traveller may require privacy and sleep during a flight, while another business traveller or group of business travellers may wish to work or hold a discussion. It would be desirable to have a flexible passenger seating arrangement able to accommodate different passenger needs, and easily reconfigurable to support different needs.

STATEMENT OF THE INVENTION

According to one aspect of the present invention, there is provided an array of passenger seating arrangements according to claim 1. According to another aspect of the present invention, there is provided an array of passenger seating arrangements according to claim 7.

According to another aspect of the present invention, there is provided an aircraft passenger seating system comprises an array of floor panels fixed within an aircraft cabin section, the floor panels providing an array of discrete fixing means for removable attachment of a plurality of passenger seating units and/or monuments. The seating units may be of mutually different configurations each having a common footprint, such that the different configurations are interchangeable without having to re-arrange other seating units. The common footprint may correspond to a common size and shape of floor panel or the floor panels may provide a regular array of discrete fixing means such that the configurations may be positioned regardless of the position of the floor panels.

In one embodiment, at least one of the floor panels has a plurality of passenger seats attached thereto. Each of the plurality of seats may be discretely attached to that floor panel so as to be removable independently of any other seats attached to that floor panel. In an alternative embodiment, at least some of the plurality of seats may be jointly attached to that floor panel.

One seat configuration may comprise a plurality of seats facing substantially in the same direction. The seat configuration may comprise a corresponding pair of seat rows facing mutually inwardly. Where the footprint is aligned with a plurality of floor panels, the configuration may be removably attached to a pair of adjacent said floor panels. Each seat row may comprise two or more seats. A table may be provided between the pair of seat rows. An IFE (in-flight entertainment) unit may be provided adjacent one or both of the seats rows, the IFE unit being removably attached to one or more of the floor panel. A privacy screen may be provided at least partially around the pair of seat rows.

An alternative configuration comprises a pair of seats offset laterally and facing in opposite directions. The pair of seats may share an inner armrest arranged to extend into the space of each seat towards the forward end of that seat.

An alternative configuration may comprise a pair of seats facing in opposite directions. A privacy screen may be arranged around each seat. The configuration may be removably attached to a pair of adjacent floor panels, each of the pair of floor panels carrying one seat and one or more seating components for another seat. The component(s) may include a foot-rest. The corresponding seats of the pair of floor panels may face in opposite directions.

An alternative configuration comprises a staggered seating arrangement. Where the footprint is aligned with a plurality of floor panels, each floor panel carries a seat on one lateral side and one or more seating components on the other lateral side, longitudinally adjacent floor panels having seats on opposite lateral sides. A privacy screen may be provided between the seat and the seating component(s) on the same floor panel.

Another configuration comprises a seat and a secondary surface. The secondary surface may comprise a footstool, secondary seat or bed surface. The seat may be configurable between seat and bed configurations. Where the footprint is aligned with a plurality of floor panels, the configuration may be removably attached to a pair of adjacent floor panels, the configuration comprising a seat attached to one of the pair of floor panels and the secondary surface attached to the other one of the pair of floor panels.

One or more longitudinally extending lateral surfaces may be provided to one or both sides of the seat. The lateral surface(s) may be arranged to provide a flat bed surface in conjunction with the seat in its bed configuration. A privacy screen may be provided at least partially around the seating arrangement. Laterally adjacent seating units may be separated by a privacy screen, or the privacy screen may be removed to allow a double bed configuration between the two adjacent seats when in bed configuration.

Each said floor panel may comprise fixing means for removable attachment of seats and/or seat components thereto. The fixing means may comprise a matrix of fixing apertures. The matrix may comprise a regular grid, such as a rectangular or triangular grid. Alternatively or additionally, the fixing means may comprise one or more elongate tracks. The tracks may comprise a plurality of parallel, non-parallel or intersecting tracks. In the case of parallel tracks, these may be formed of extruded material, such as aluminium. At least the upper surface of the floor panel may be formed of the extruded material.

Each floor panel may be fixed onto an existing floor of the aircraft cabin section. Alternatively, each floor panel may be attached directly to internal structure of the aircraft cabin section, such as longitudinal beams connected to the aircraft fuselage.

Alternative aspects of the invention include the floor panels, the seating arrangements, and methods of constructing and/or reconfiguring the seating arrangements.

BRIEF DESCRIPTION OF THE DRAWINGS

Embodiments of the invention will now be described with reference to the drawings identified below.

FIG. 1a is a schematic plan view of a passenger deck section comprising an array of floor panels fixed to conventional fixing tracks, in a first embodiment of the invention.

FIGS. 1b and 1c are respectively a sectional plan view and vertical lateral cross-section of the passenger deck section of FIG. 1a.

FIG. 2a is a schematic plan view of a passenger deck section comprising an array of floor panels fixed directly to a conventional arrangement of longitudinally extending beams of an aircraft, in a second embodiment.

FIGS. 2b and 2c are respectively a sectional plan view and vertical lateral cross-section of the passenger deck section of FIG. 2a.

FIGS. 3b and 3c are respectively a sectional plan view and vertical lateral cross-section of the passenger deck section of FIG. 3a.

FIGS. 7a and 7b are plan and sectional views respectively of a fourth fixing arrangement in a floor panel of the first to third embodiment.

FIGS. 8a and 8b are plan and sectional views respectively of a fifth fixing arrangement in a floor panel of the first to third embodiment.

DETAILED DESCRIPTION OF THE EMBODIMENTS

Terminology

Figure 1D:
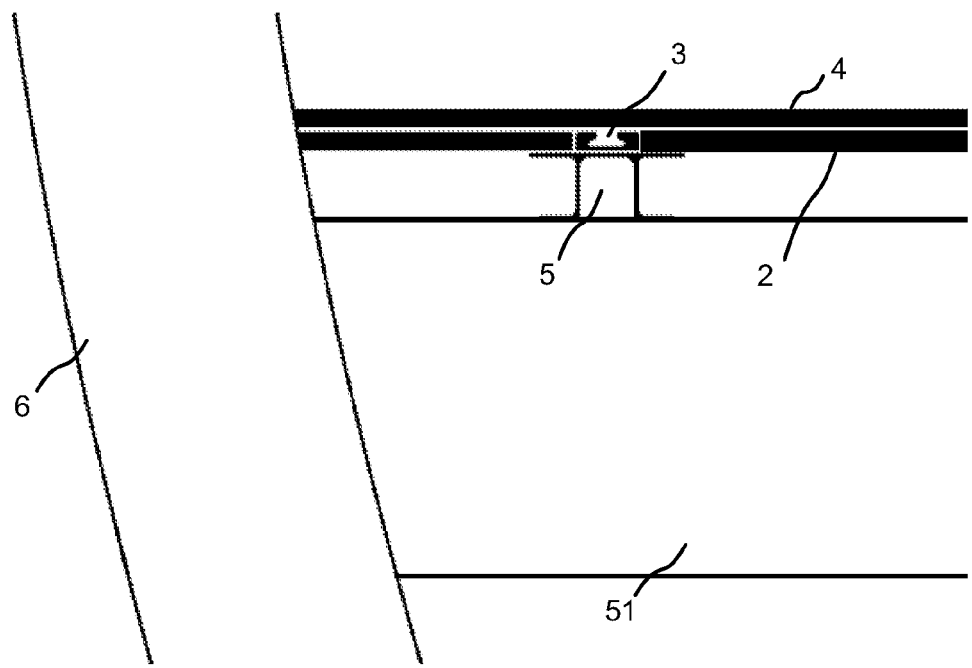
FIG. 1d is a close-up of the lateral cross-section of FIG. 1c.
Figure 2D:
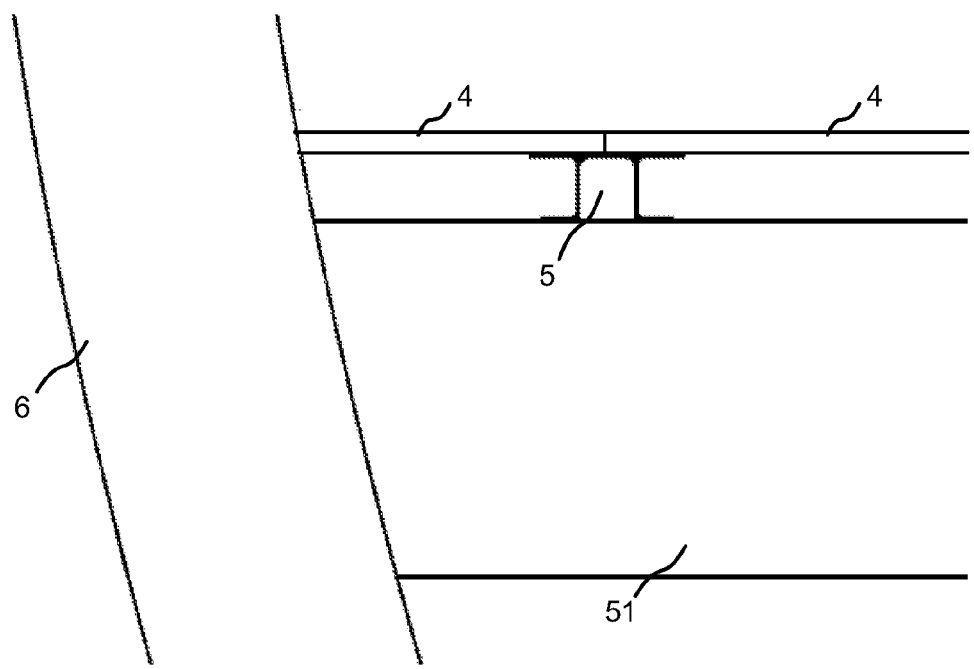
FIG. 2d is a close-up of the lateral cross-section of FIG. 2c.

In describing the embodiments, 'horizontal' and 'vertical' and similar terms are defined with reference to the floor of the passenger seating area of the aircraft. As in well known in the art, the angle of the floor relative to the gravitational horizontal is determined by the pitch of the aircraft, which is about 15° during takeoff and landing, and about 3° in level flight. 'Lateral' and 'longitudinal' are defined with reference to the major axis of the aircraft fuselage or cabin.

A 'seating unit' or 'seating arrangement' comprises a seat for a passenger and associated parts for use by that passenger; these may be for exclusive use by the passenger, or may be shared with adjacent passengers. When describing an individual seating unit, 'forward' and 'rearward' and similar terms are defined with reference to the direction in which the passenger faces when seated.

A 'seating configuration' comprises a configuration of one or more seating units or arrangements. The 'footprint' of a seating configuration is the floor area occupied by the seating configuration.

A 'monument' comprises a cabin component other than a seat, that is attached to the cabin floor, such as a communal wardrobe, a toilet unit, a bassinet etc.

Like parts are indicated using the same reference numerals between different embodiments or variants. To avoid repetition, the description of such parts may not be repeated for each embodiment or variant, it being understood that the relevant features of the part are provided in each embodiment or variant in which that part is indicated. For clarity, some reference numerals may be omitted in some of the figures.

Internal Structure

Figure 22A:
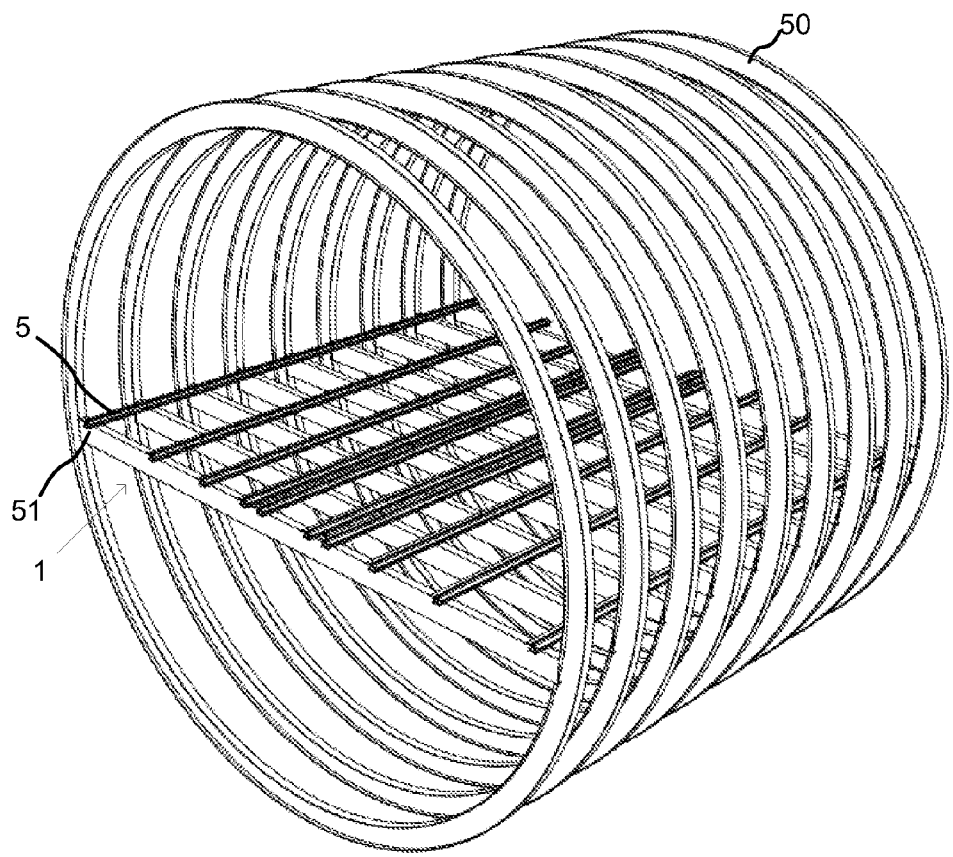
FIG. 22a is a schematic perspective view of the conventional internal structure of a section of aircraft fuselage, without floor panels.
Figure 22B:
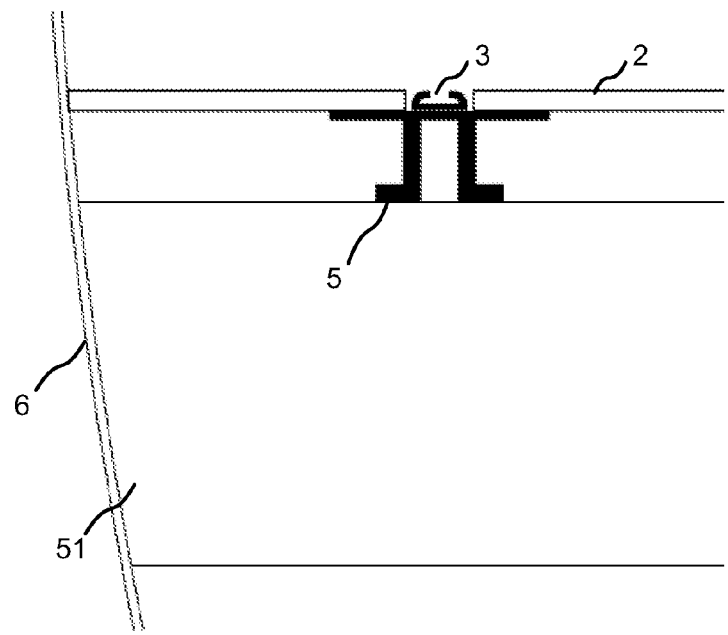
FIG. 22b is a lateral cross-section of the conventional internal structure of the aircraft, with floor panels.

To aid understanding of embodiments of the invention, a conventional internal structure of a section of passenger aircraft fuselage including a deck section 1 is described with reference to FIGS. 22*a* and 22*b*. The fuselage section comprises a plurality of longitudinally spaced circumferential ribs 50 each having a laterally extending joist 51 attached thereto, on which the deck section 1 is formed. Longitudinally extending parallel beams 5 are attached to the joists 51. As shown in FIG. 15*b*, longitudinally extending fixing tracks 3 are attached to the upper sides of the beams 5, and floor panels 2 are attached between adjacent beams 5, and between the outermost beam 5 on each side and the wall 6.

Floor Panel Array

In embodiments of the invention, floor panels 4 are provided having fixing arrangements to allow seats or seating components to be removably attached thereto. The floor panels 4 may be attached to the conventional fixing tracks 3, as described in the first embodiment below with reference to FIGS. 1*a* to 1*d*, or may be attached directly to the beams 5, as described in the second and third embodiments below with reference to FIGS. 2*a* to 2*c* and 3*a* to 3*c* respectively. In the third embodiment, the beams 5 are repositioned to have even lateral spacing therebetween.

In the first embodiment shown in FIGS. 1*a* to 1*d*, the passenger deck section 1 is located within a cabin section having substantially parallel walls 6. The deck section 1 comprises floor panels 2 of conventional construction, including the parallel longitudinally extending fixing tracks 3 of standard type. The floor panels 4 are rectangular and are attached to the fixing tracks 3 to form a contiguous array substantially completely covering the conventional floor panels 2. The floor panels 4 may abut or be connected to each other at their edges. The floor panels 4 are shown as all being of the same size and shape, but may be of different sizes and shapes according to the constraints of the fixing tracks 3 and/or the size of the deck section 1.

In the second embodiment shown in FIGS. 2*a* to 2*d*, the floor panels 2 and fixing tracks 3 are replaced by an array of floor panels 4, which are attached directly to the beams 5. It is not essential that the deck section 1 be supplied with conventional floor panels 2 and/or fixing tracks 3 in place, and that these be removed and replaced by the floor panels 4. Instead, the deck section 1 may be supplied without the floor panels 2 and fixing tracks 3, and the floor panels 4 may then be attached to the beams 5.

As in the first embodiment, the floor panels 4 are arranged to form a contiguous array so as to provide a floor of the passenger deck section 1. The floor panels 4 are dimensioned so that their lateral edges coincide with, and may therefore be attached to, one of the beams 5. The closer spacing of the conventional beams 5 in the centre of the deck section 1 necessitates a row of laterally wider panels 4 in the centre, although two or three smaller panels may be arranged laterally instead of one of the laterally wider panels 4.

Figure 3A:
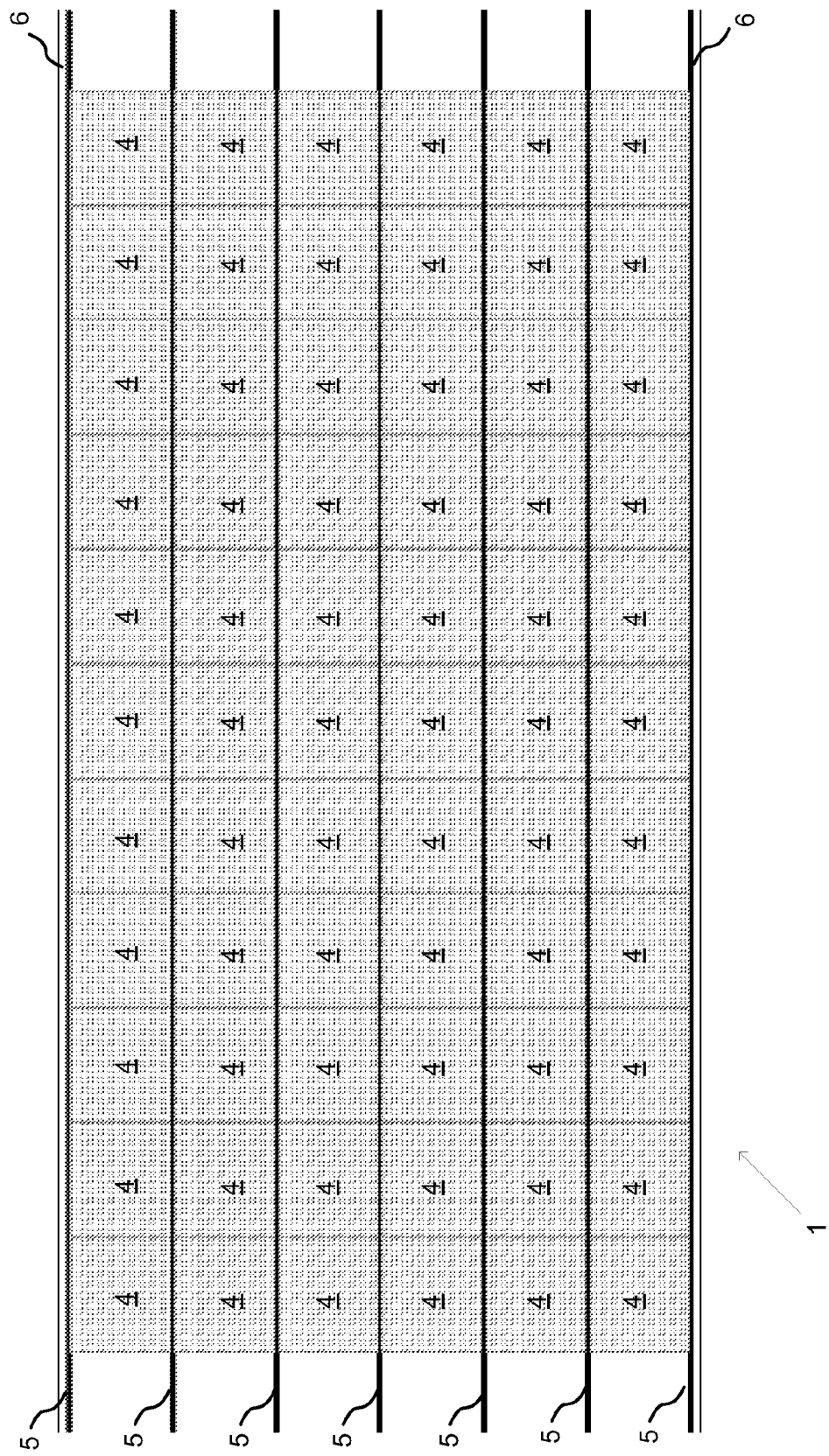
FIG. 3a is a schematic plan view of a passenger deck section comprising an array of floor panels fixed directly to a reconfigured arrangement of longitudinally extending beams of an aircraft, in a third embodiment.

A third embodiment as shown in FIGS. 3*a* to 3*c* is similar to the second embodiment, except that the conventional beams 5 are replaced by laterally evenly spaced beams 5, thus allowing floor panels 4 of the same lateral width to be used across the width of the deck section 1. As in the second embodiment, the panels 4 are fixed at their lateral edges to the beams 5. Preferably, the deck section 1 is supplied with laterally evenly spaced beams 5, rather than requiring the conventional beams 5 to be moved or replaced.

Fixing Arrangements

Alternative fixing arrangements in the floor panels 4 for attachment of seat and/or monument parts will now be described with reference to FIGS. 4 to 8*b*. Each of these fixing arrangements is applicable to any of the first to third embodiments.

Figure 4:
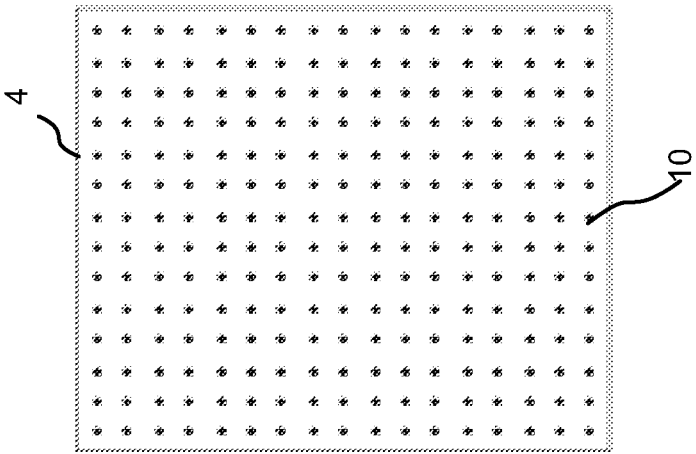
FIG. 4 is a plan view of a first fixing arrangement in a floor panel of the first to third embodiment.

In a first fixing arrangement shown in FIG. 4, the upper surface of the floor panel 4 comprises a grid of fixing apertures 10, preferably evenly spaced. The grid may comprise a rectangular or triangular grid, for example. The grid may repeat across multiple such floor panels 4, when arranged in an array as for example in any of the first to third embodiments, so as to provide a regular grid across substantially the entire deck section 1. The regular grid of fixing apertures 10 allows great flexibility in the position of attachment of parts to the floor panels 4.

Each aperture 10 may be arranged to receive a removable fixing bolt or other removable attachment means, as described for example in WO-A-2009/15809, for attaching a seat or seating portion, a section of carpet or a wiring component, for example.

Figure 5:
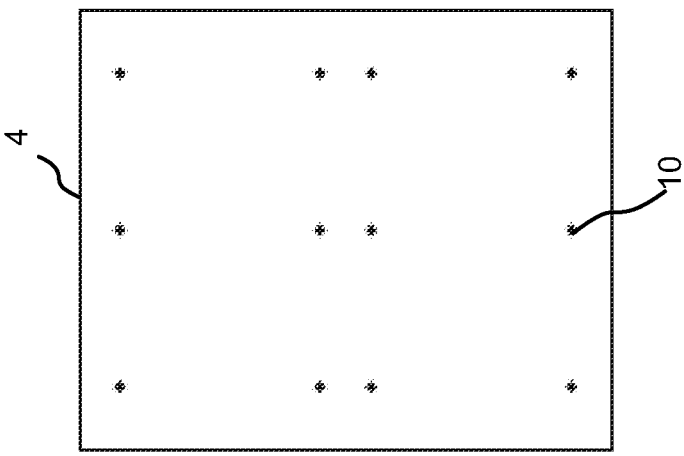
FIG. 5 is a plan view of a second fixing arrangement in a floor panel of the first to third embodiment.

In a second fixing arrangement shown in FIG. 5, a relatively small number of fixing apertures 10, each similar to those of the first fixing arrangement, may be provided in the upper surface of the floor panel 4. The fixing apertures may be arranged in an irregular grid, such a rectangular or triangular grid, arranged to be aligned with attachment points of different seat configurations, as described below. This fixing arrangement provides less flexibility in the position of attachment of parts to the floor panel 4, but the strength of the floor panel 4 may be less compromised. Also, the smaller number of fixing apertures may be less obtrusive and may therefore not require a carpet or other covering. For example, unused ones of the fixing apertures may be filled with removable plugs.

Figure 6:
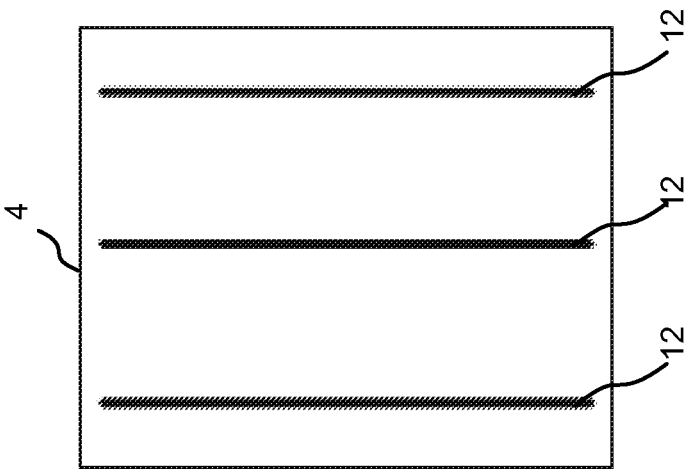
FIG. 6 is a plan view of a third fixing arrangement in a floor panel of the first to third embodiment.

In a third fixing arrangement shown in FIG. 6, one or more elongate apertures, such as rails or tracks 12, may be provided in the upper surface of the floor panel 4. In the case of multiple rails or tracks 12, these may be parallel, non-parallel or intersecting. The tracks 12 may be arranged to run longitudinally or laterally of the aircraft. The tracks 12 are arranged for removable attachment of a seat or monument part, and may be similar to the conventional fixing tracks in that respect.

In a fourth fixing arrangement shown in FIGS. 7*a* and 7*b*, the floor panel 4 has an extruded cross-section which forms parallel tracks 12 for removable attachment of seats or seating components. The tracks 12 may be re-entrant in cross-section, so as to retain suitable fixing means, such as an expanding or twist-lock bolt. The tracks 12 may be of extruded aluminium, for example. The floor panel 4 may be completely formed of extruded material, or may be of composite material with only the upper surface including the tracks 12 being formed of extruded material.

A fifth fixing arrangement shown in FIGS. 8a and 8b is similar to the fourth fixing arrangement, but is formed from a plurality of floor panels 4, having interlocking edges 14. Preferably, the interlocking edges 14 allow individual floor panels 4 to be removed and replaced without the removal or replacement of adjacent floor panels 4.

In either the fourth or fifth fixing arrangement, the tracks 12 are preferably arranged so as to be evenly spaced across multiple such floor panels 4, when arranged for example in any of the first to third embodiments, so as to provide regularly spaced tracks across substantially the entire deck section 1; this allows great flexibility in the position of attachment of parts to the floor panels 4.

Floor Panel Shapes and Sizes

In each embodiment and/or fixing arrangement, the floor panels 4 may be of one or more types, each type of floor panel having substantially the same size and shape. At least one type may correspond to the footprint of a seat configuration, as described below, or to a fraction of that footprint, so that a small integral number (preferably 4 or fewer) of floor panels may be tessellated to create one footprint. As a result, the parts attached to a single floor panel 4 or small number of adjacent floor panels 4 may be removed or reconfigured without the need to remove or reconfigure other parts attached to other floor panels 4 within the deck section 1.

The alignment of a footprint with floor panels 4 is advantageous with fixing arrangements that are not regularly spaced across an array of floor panels 4, as for example in the second fixing arrangement. Such alignment is not essential with fixing arrangements that are regularly spaced across an array of floor panels 4, as for example in the first, fourth or fifth fixing arrangements.

The different types of floor panel 4 may be integral multiples of a common size and shape. The shapes may be rectangular or other tessellable shape. The sizes may for example be 80, 60 or 40 inches by 47 inches (2, 1.5 or 1 m by 1.2 m).

Seat Configurations

Specific seating unit configurations which may be attached to the floor panels 4 of any one of the first to third embodiments will now be described with reference to FIGS. 9 to 20. The alignment of seat portions with floor panels 4 is described, but this alignment is optional.

Figure 9A:
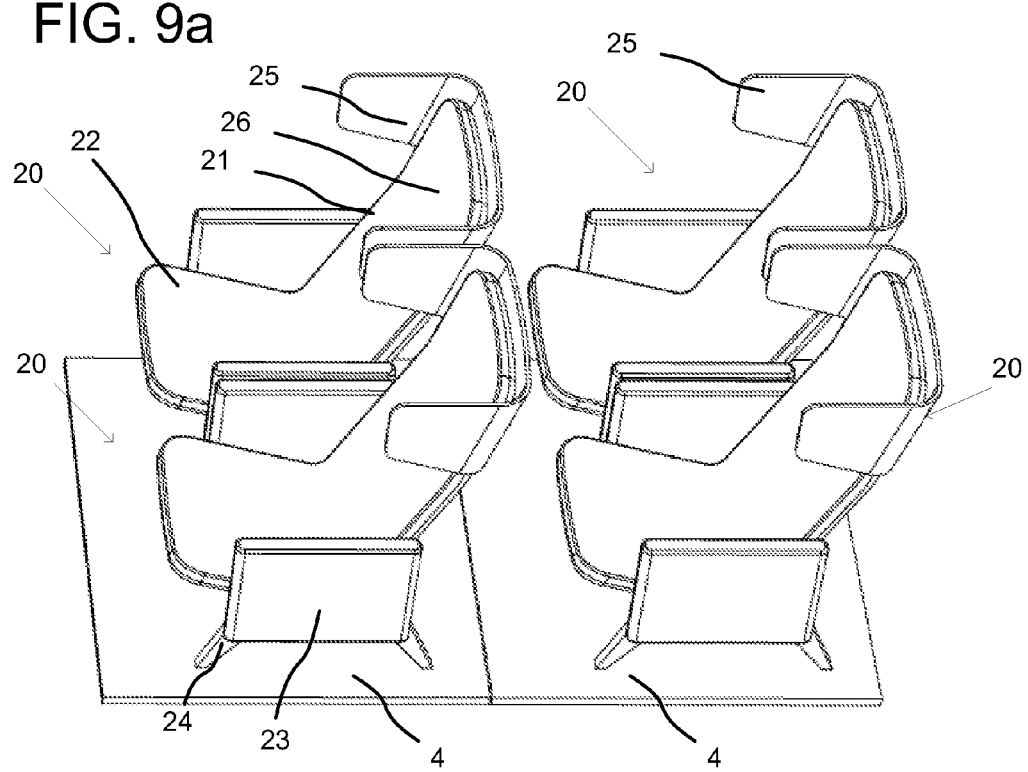
FIGS. 9a and 9b are perspective and plan views respectively of a first configuration attached to one or more floor panels of the first to third embodiment.
Figure 9B:
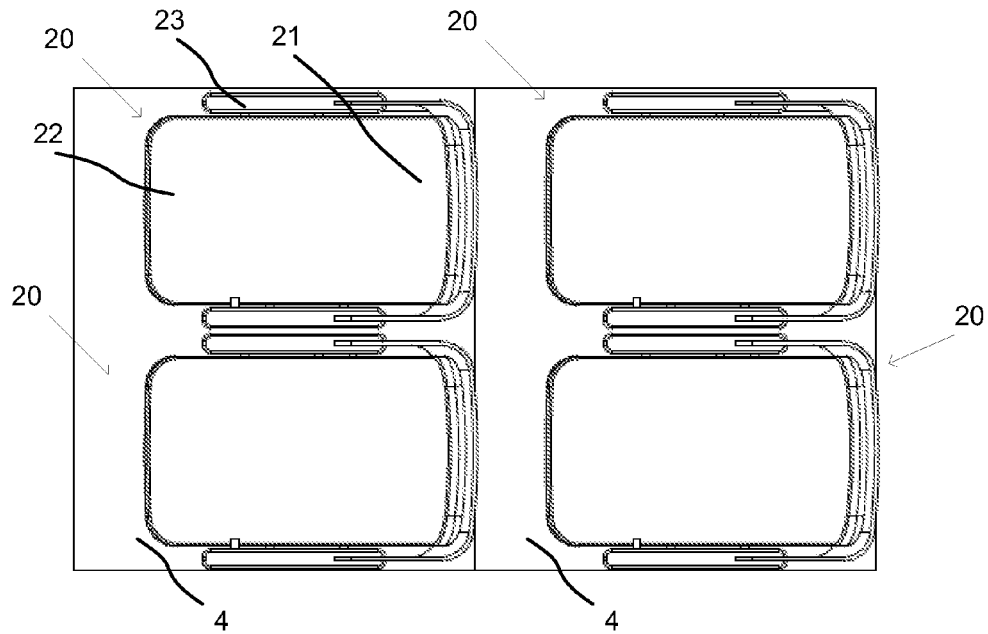

In the first configuration of FIGS. 9a and 9b, two discrete passenger seats 20 are attached side by side to the floor panel 4, facing in the same direction. Further similar pairs of passenger seats 20 may be provided on other forward or rearward floor panels 4, to provide rows or columns of seats 20. Each passenger seat 20 is of an economy type, with a seat back 21 that is only partially reclinable, or is non-reclinable. Each passenger seat has a seat pan 22 having an armrest 23 at either side. The passenger seat 20 is removably attached to the floor panel 4 by legs 24 or a seat frame. A privacy screen 25 may be provided to one or both sides of a headrest 26.

Figure 10A:
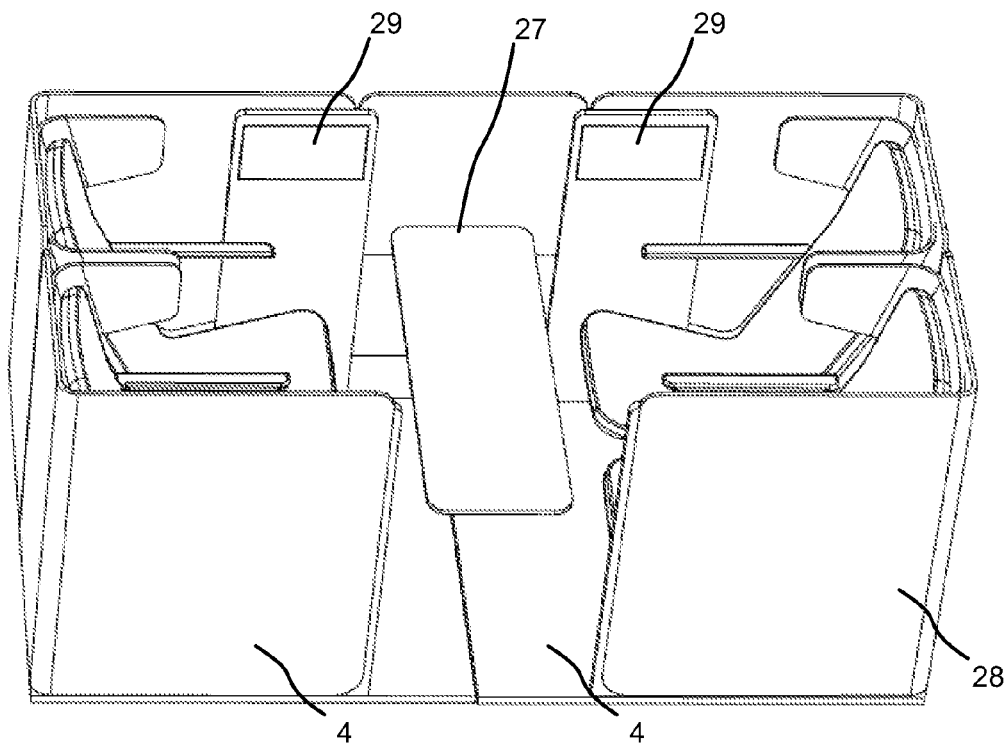
FIGS. 10a and 10b are perspective and plan views respectively of a second configuration attached to one or more floor panels of the first to third embodiment.
Figure 10B:
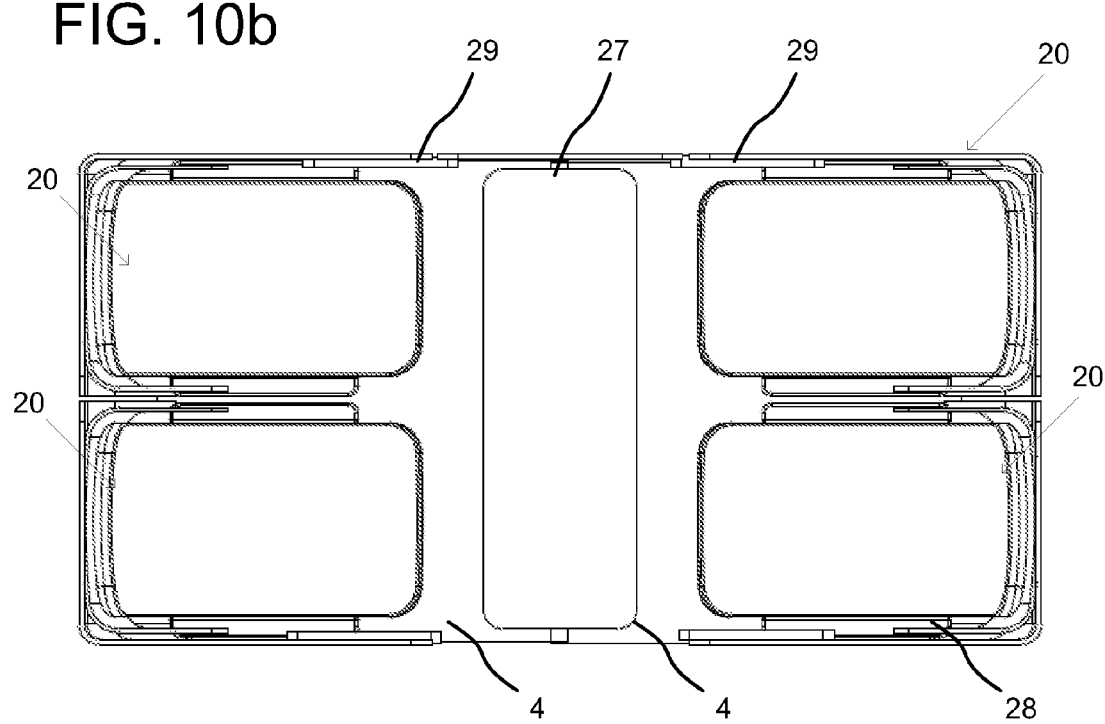

In the second configuration of FIGS. 10a and 10b, two side-by side pairs of discrete passenger seats 20 are arranged facing each other, with each pair of discrete passenger seats being removably attached to a respective floor panel 4. Each passenger seat 20 is of an economy type, with a seat back 21 that is only partially reclinable, or is non-reclinable. A housing 28 is arranged at least partially around the facing pairs of seats 20, this housing 28 being provided in sections each directly attached to the corresponding floor panel 4. A laterally facing IFE unit 29 is attached to each floor panel 4. A table 27 is provided between the facing pairs of seats 20, attached to a section of the privacy housing 28 bridging the floor panels 4. The table 27 may be stowable substantially vertically against the section of the privacy housing 28. The second configuration is suitable for business or group discussions, with a reasonable degree of privacy.

Figure 11A:
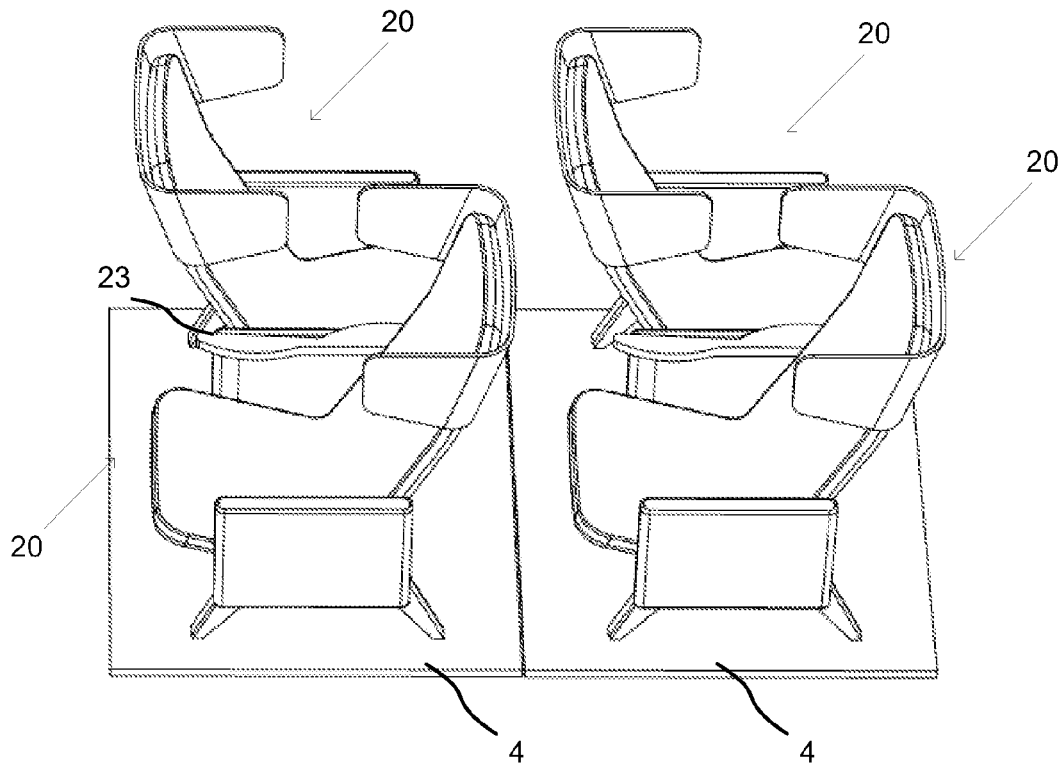
FIGS. 11a and 11b are perspective and plan views respectively of a third configuration attached to one or more floor panels of the first to third embodiment.
Figure 11B:
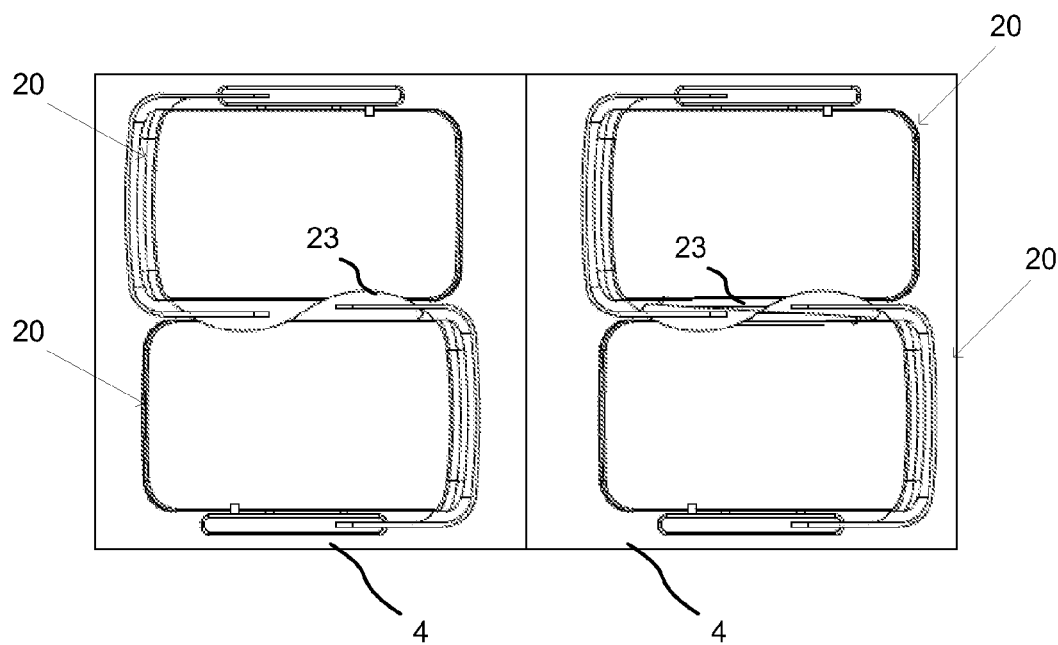

In the third configuration of FIGS. 11a and 11b, a pair of forward and backward-facing seats 20 is attached to each floor panel 4. As in the first configuration, similar pairs of passenger seats 20 may be provided on other adjacent floor panels 4, to provide rows or columns of seats 20. Each passenger seat 20 is of an economy type, with a seat back 21 that is only partially reclinable, or is non-reclinable. In this configuration, each pair of seats shares an inner armrest 23, which is arranged to extend into the space of each seat 20 towards the forward end of that seat 20. Advantageously, this takes up less lateral space than two discrete armrests.

Figure 12A:
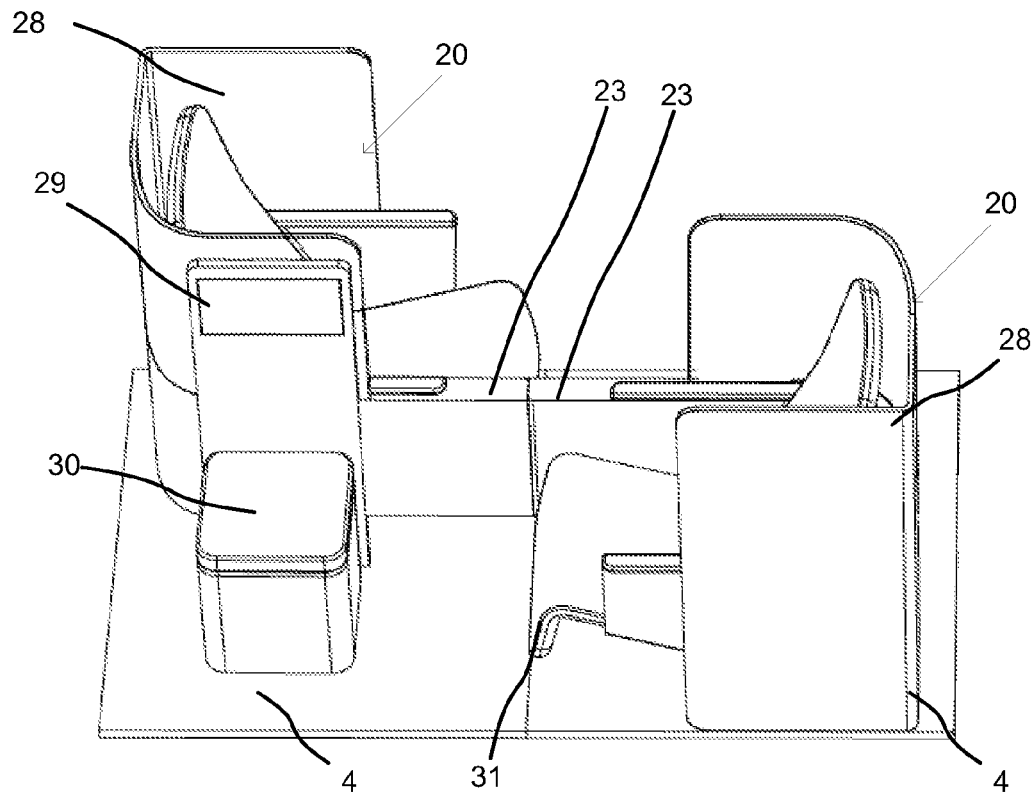
FIGS. 12a and 12b are perspective and plan views respectively of a fourth configuration attached to one or more floor panels of the first to third embodiment.
Figure 12B:
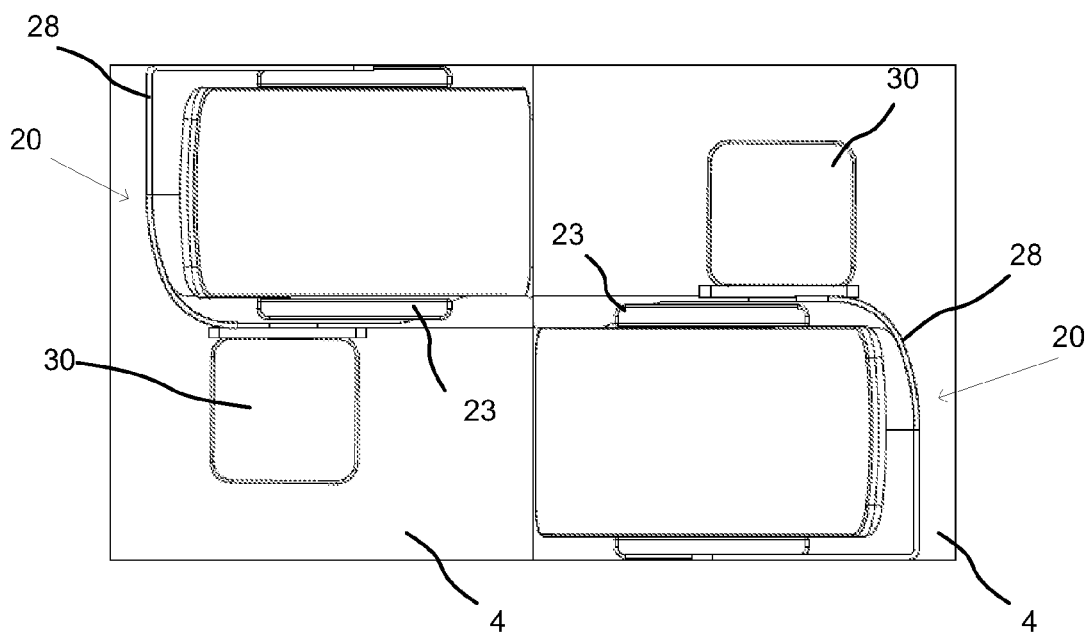

In the fourth configuration of FIGS. 12a and 12b, a pair of discrete forward and backward facing seats 20 is provided, each seat 20 being provided on one lateral side of a respective floor panel 4 and having an IFE unit 29 and a foot-rest 30 for the other seat 20 provided on the other lateral side of the floor panel 4. In this configuration, each seat 20 is fully reclinable or reconfigurable so as to form a substantially flat, horizontal bed surface together with the foot rest 30, and is suitable for business or first class. A privacy housing 28 is provided around the back of each seat 20. The seat 20 may include a leg rest 31 that extends horizontally from the seat pan 22 as part of the bed surface. The inner armrests 23 of the respective seats 20 overlap in the lateral direction, thereby providing greater width for each seat 20.

Figure 13A:
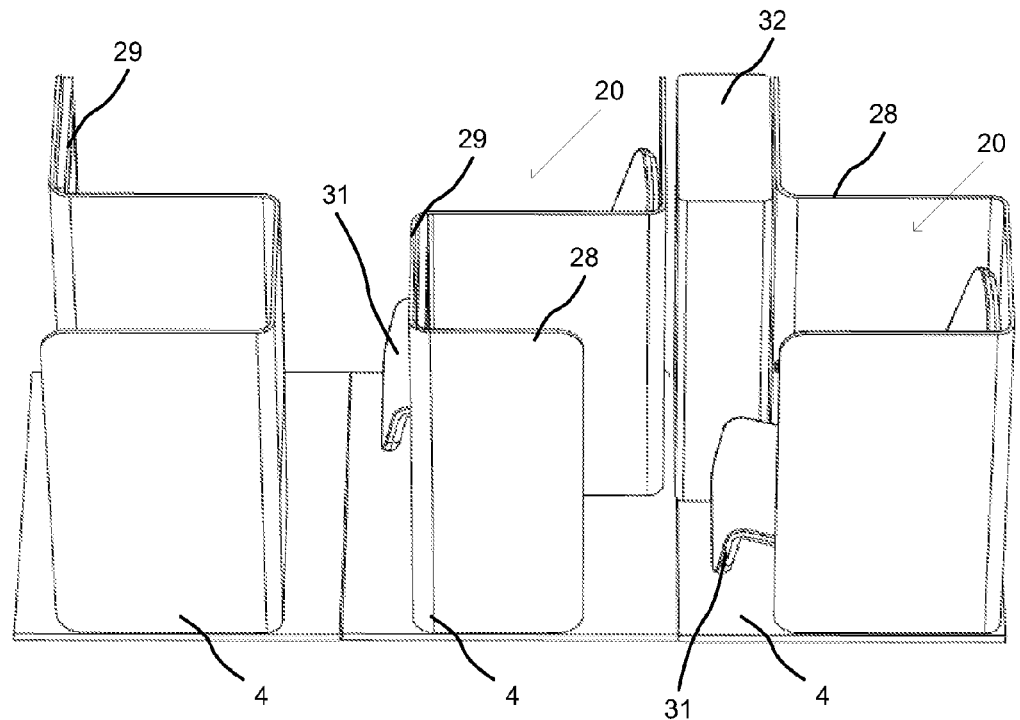
FIGS. 13a and 13b are perspective and plan views respectively of a fifth configuration attached to one or more floor panels of the first to third embodiment.
Figure 13B:
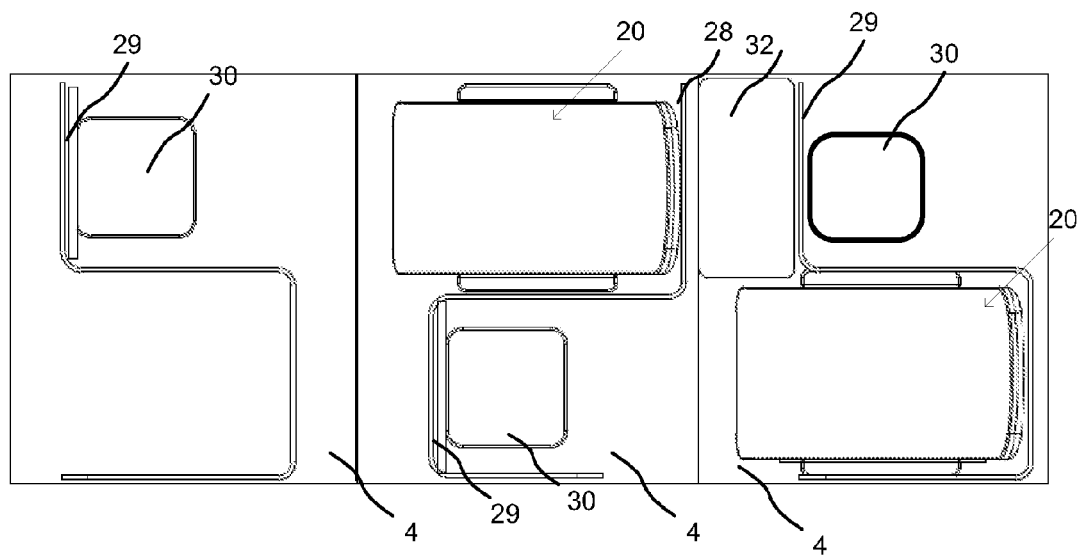

In the fifth configuration of FIGS. 13a and 13b, a staggered arrangement of seats 20 is provided by attaching a seat 20 to one lateral side of each floor panel 4, and attaching seating components for another, adjacent seat 20 to the other lateral side of the floor panel 4. The staggered arrangement is created by attaching the seats 20 to opposite lateral sides of longitudinally adjacent floor panels 4.

A privacy housing 28 may be provided between the lateral sides of the floor panel 4, and optionally extending around the back of the seat 20. The seating components may comprise a foot-rest 30 and/or IFE unit 29, for example. The seats 20 may be configurable between a seat position and a bed position, with the foot-rest 30 providing a bed surface for the seat 20 in bed position.

Additionally, there may be attached to the floor panel 4 seating components for the seat 20 attached to that floor panel 4, the seating components comprising for example a wardrobe or storage unit 32.

Figure 14A:
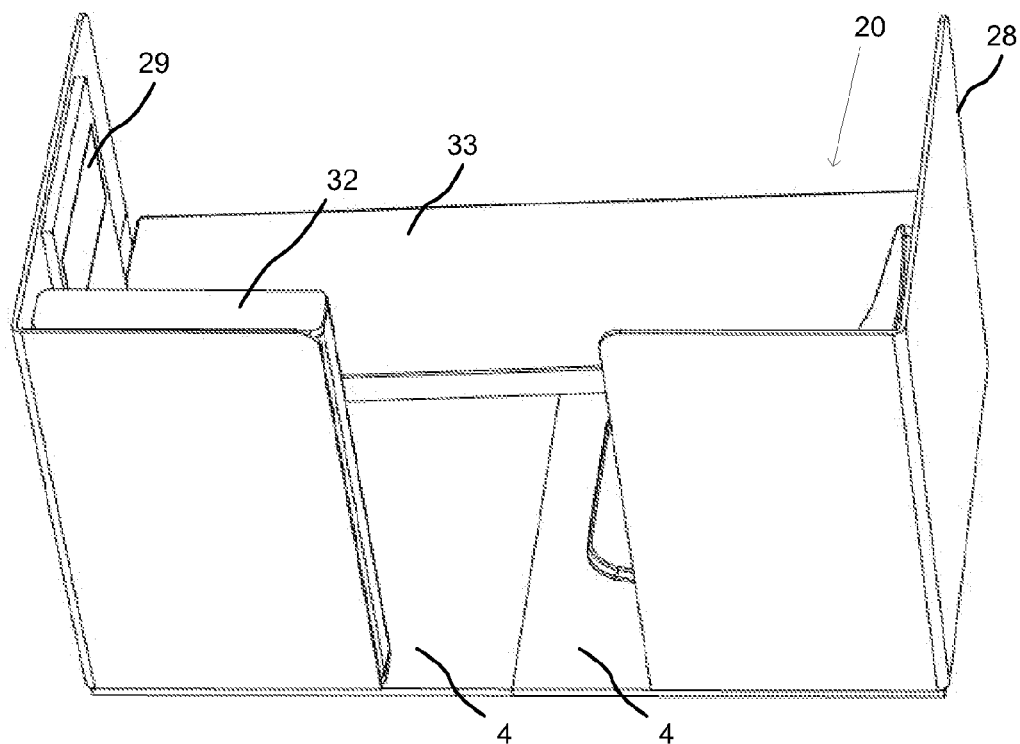
FIGS. 14a and 14b are perspective and plan views respectively of a sixth configuration attached to one or more floor panels of the first to third embodiment.
Figure 14B:
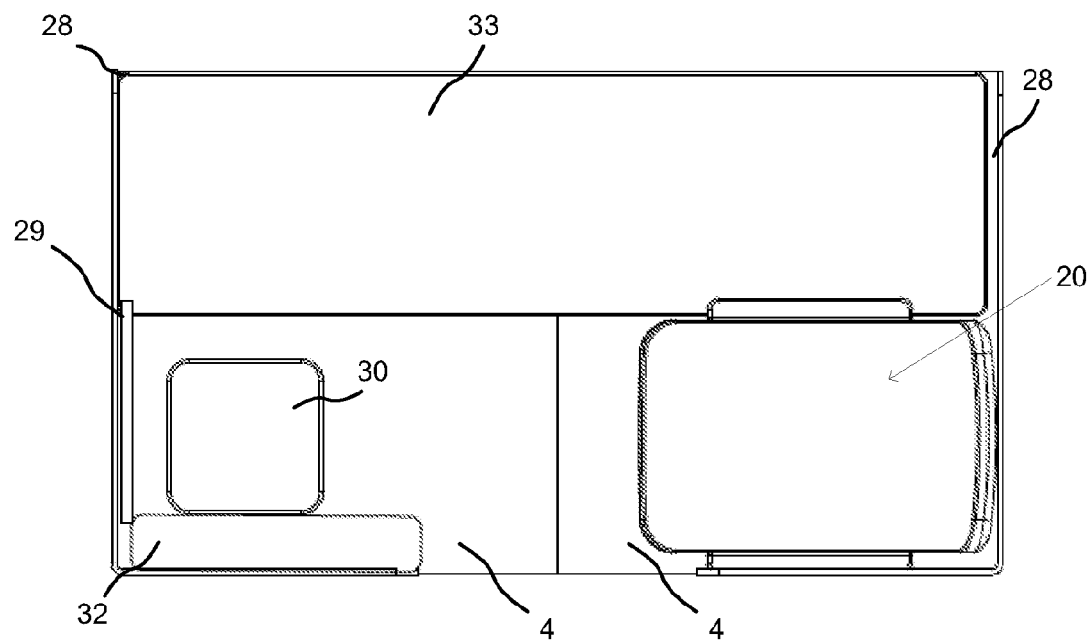

In the sixth configuration of FIGS. 14a and 14b, a single seating unit is removably attached to a pair of floor panels 4, one of which carries the seat 20 and the other of which carries the associated seating components such as foot-rest 30, IFE unit 29 and/or storage unit 32. A lateral bed surface 33 extends to one side of the seat 20, across the pair of floor panels 4. The seat 20 may be configurable between a seat position and a bed position; in the bed position, the seat 20 forms a substantially flat and continuous surface with the bed surface 33 and optionally the foot-rest 30. Alternatively, the bed surface 33 may be sufficiently wide that the seat 20 is not required to form part of the bed, in which case the seat 20 need not be configurable to a bed position. A privacy housing 28 may be provided at opposite longitudinal ends of the pair of floor panels 4.

Figure 14C:
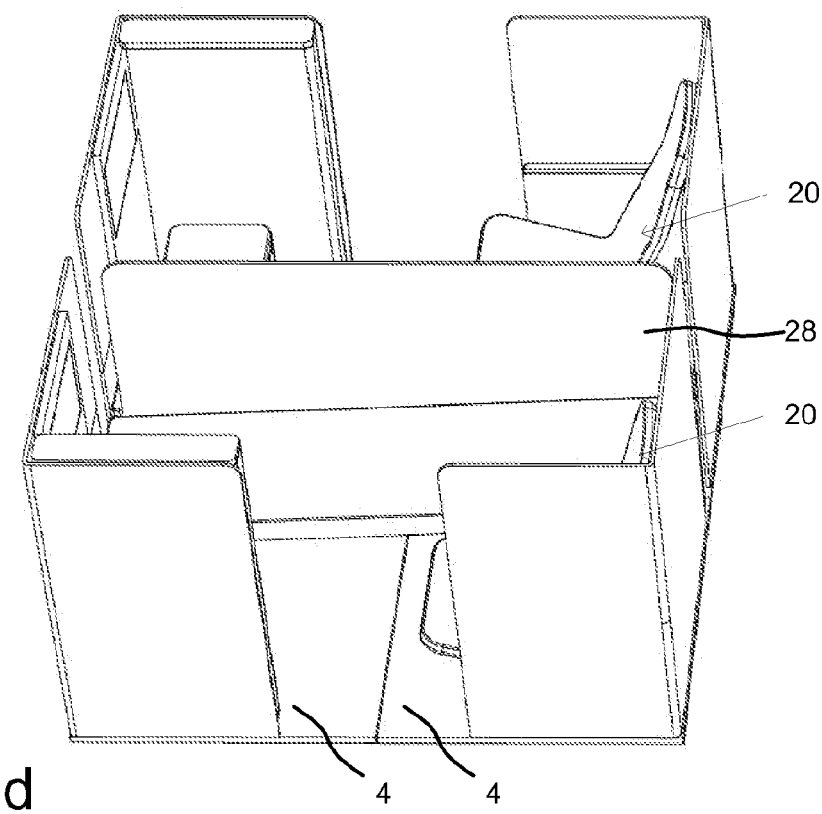
FIGS. 14c and 14d are perspective and plan views respectively of a plurality of seats of the sixth configuration.
Figure 14D:
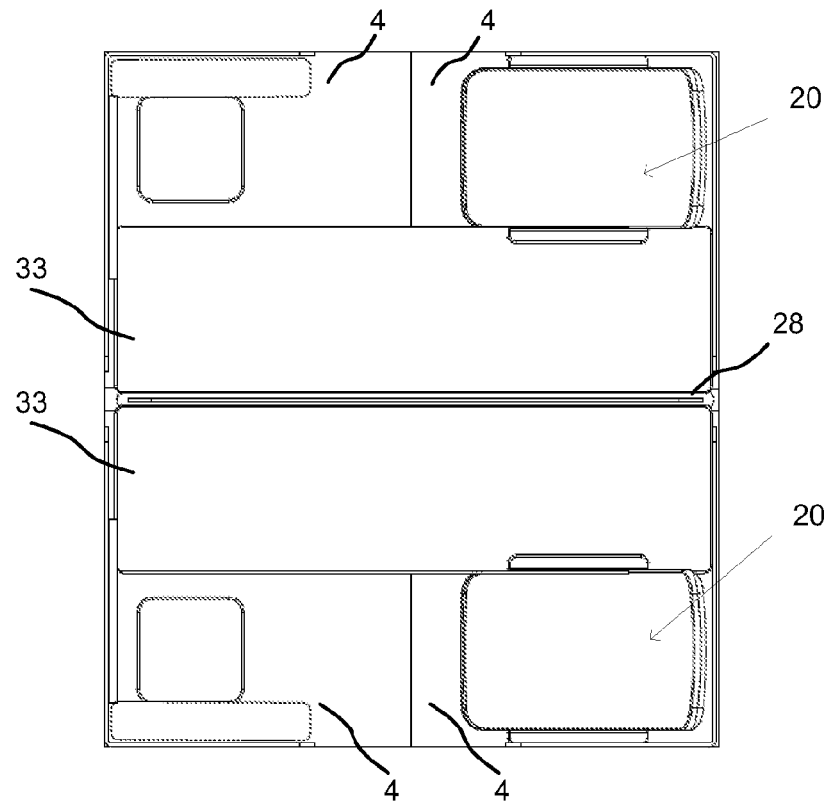

As shown in FIGS. 14c and 14d, laterally adjacent pairs of seating arrangements according to the sixth configuration may be separated by a privacy housing 28, removably attached to the floor panels 4. The privacy housing 28 may be removable so as to provide a double bed configuration across the adjacent bed surfaces 33 and optionally the respective seats 20 when in bed configuration.

In the seventh configuration shown in FIGS. 15a to 15d, 16 and 17, a pair of forward and backward facing seats 20 is provided, with a boundary line B between the seats 20 being angled to the longitudinal direction L, in which the seats 20 face. The width of a portion of the seating arrangement around the seat 20 is wider than a portion forward of the seat 20, such as the leg area and foot rest 30 of the seat 20. The angle between the boundary line B and the longitudinal direction L may be between 1 and 3°, and preferably approximately 2°.

In this configuration, each seat 20 is preferably fully reclinable or reconfigurable so that the seat back 21 and/or the seat pan 22 form a substantially flat, horizontal bed surface together with the foot rest 30, and is suitable for business or first class.

A first housing 28a is provided around the back of each seat 20, and a second housing 28b is provided around the foot rest 30 of the seating arrangement positioned towards an aisle A.

The seat 20 may include a leg rest 31 that extends from the forward end of the seat pan 22. The leg rest 31 may pivot or otherwise deploy into a horizontal position as part of the bed surface, and may be stowed, for example in a substantially vertical position, when the seat 20 is in an upright position.

An IFE unit 29 for the seat 20 adjacent the aisle A is mounted on a side wall of the second housing 28b and the display screen of the IFE unit 29 may be pivotally mounted so as to face the seat 20.

A forward console table 34 is provided forward of the inner armrest 23 of each pair of seating arrangements. Optionally, a rearward console table 35 is provided rearward of the inner armrest 23b, accessible when the seat 20 is configured as a bed. The console tables 34, 35 are preferably fixed in position, and are not stowable.

A retractable privacy screen 36 may be provided along at least part of the boundary line B between the pair of seating arrangements. Preferably, a privacy screen 36 is provided for each of the pair of seating arrangements, arranged to one side of the seat 20.

A storage compartment or unit 32 may be provided under and behind the seat 20, accessible through an aperture 32 or door (not shown) in the housing 28.

Each pair of forward and backward facing seating arrangements, as shown in FIGS. 15a to 15d, may be provided on one floor panel 4, or on a plurality of floor panels 4. The seat 20, first housing 28a, second housing 28b and foot rest 30 may be provided as discrete components each fixed to the floor panel(s) 4 independently of each other. The console tables 34, 35 may be integral with the first housing 28a.

Figure 15A:
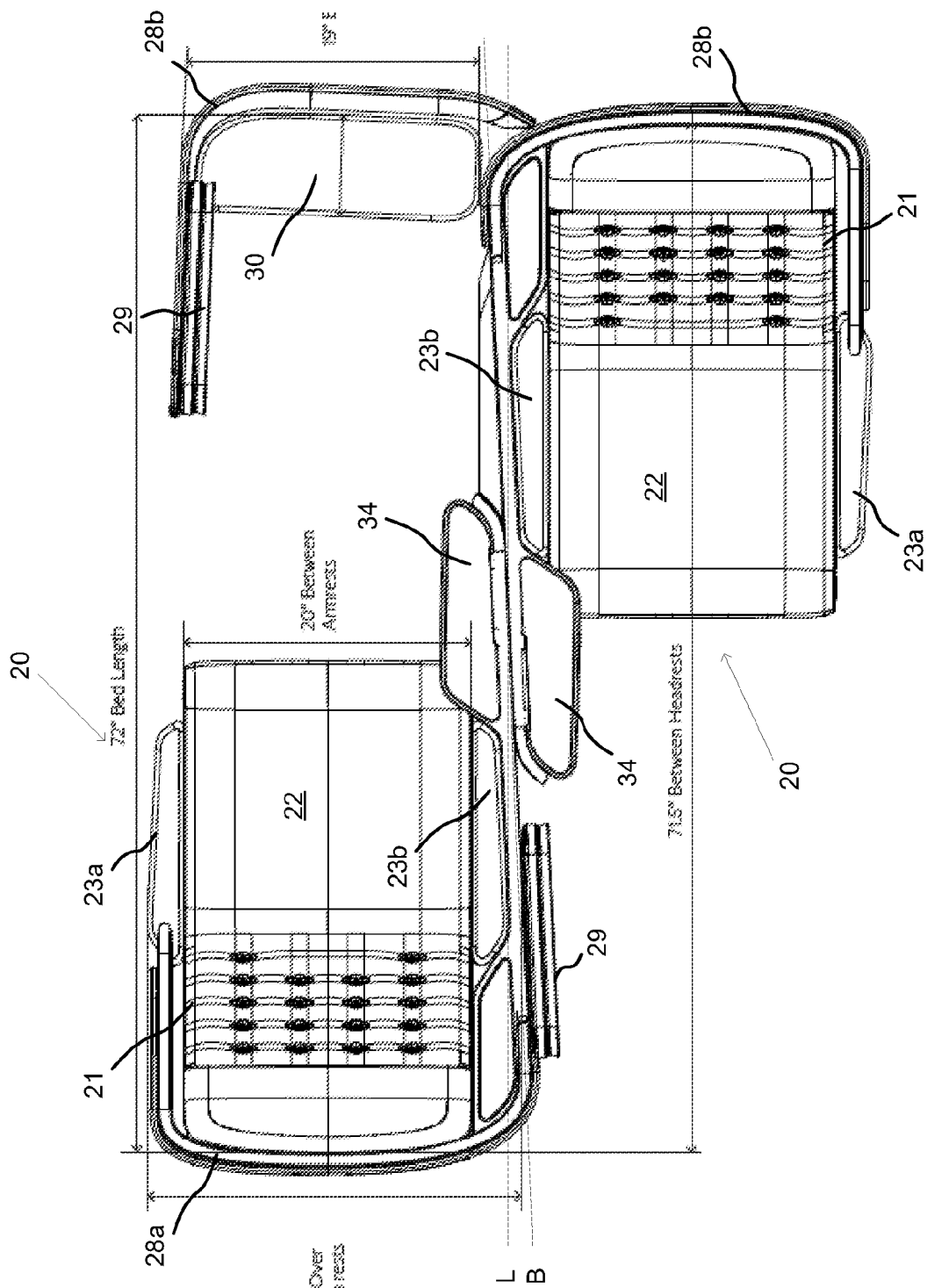
FIGS. 15a to 15d are respectively plan, perspective, side and end views of a pair of seating arrangements according to a seventh seat configuration.
Figure 15B:
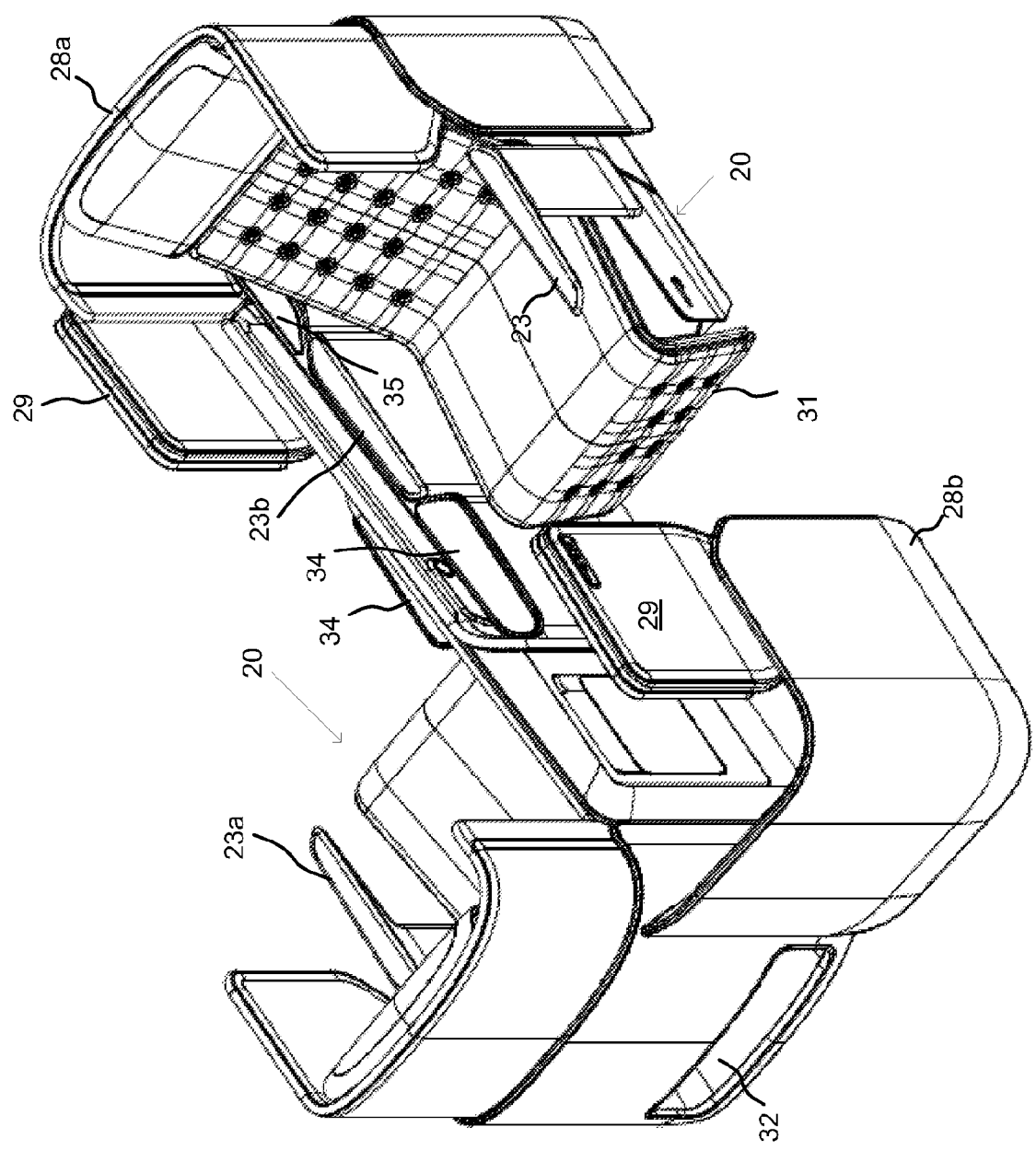
Figure 15C:
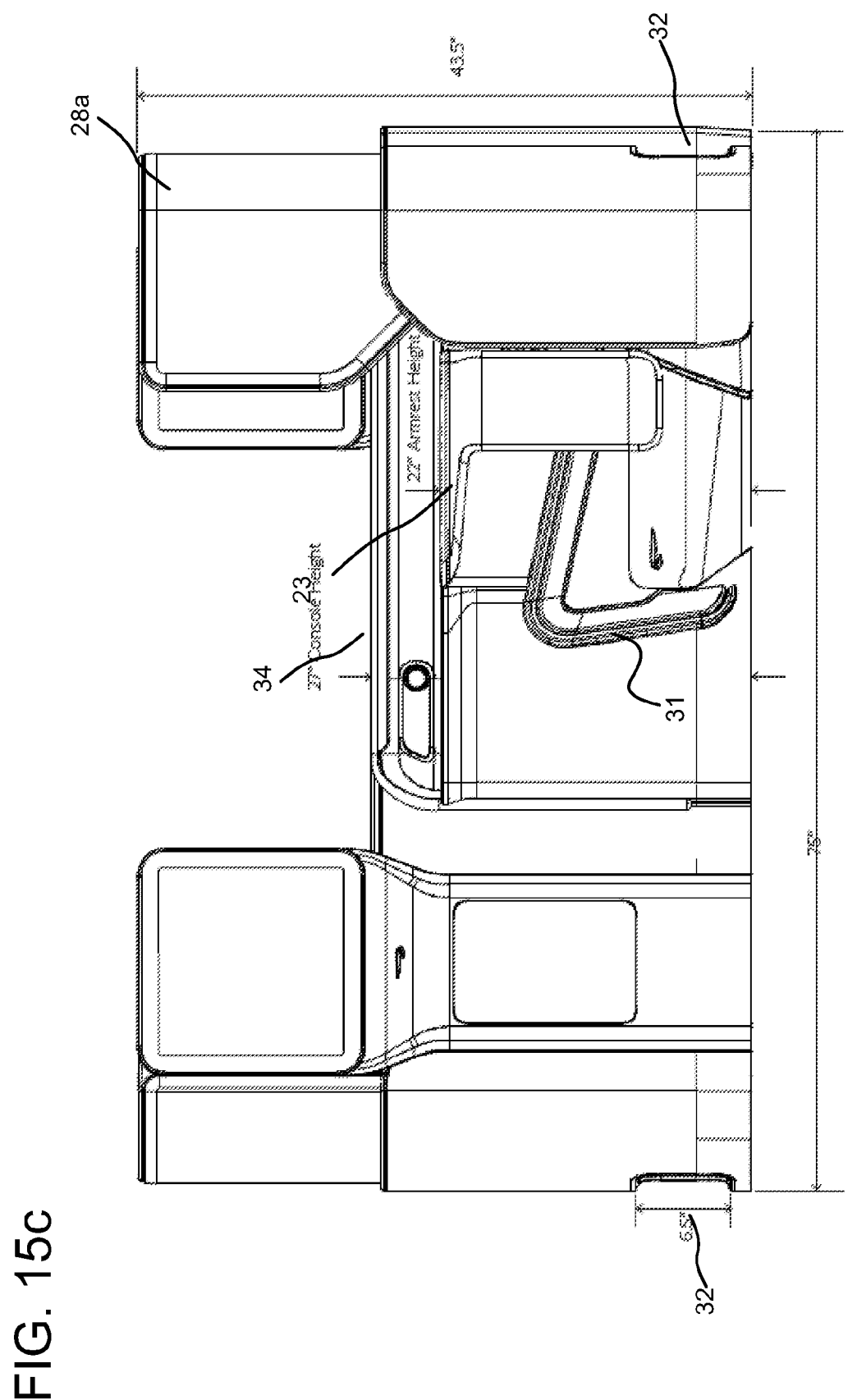
Figure 15D:
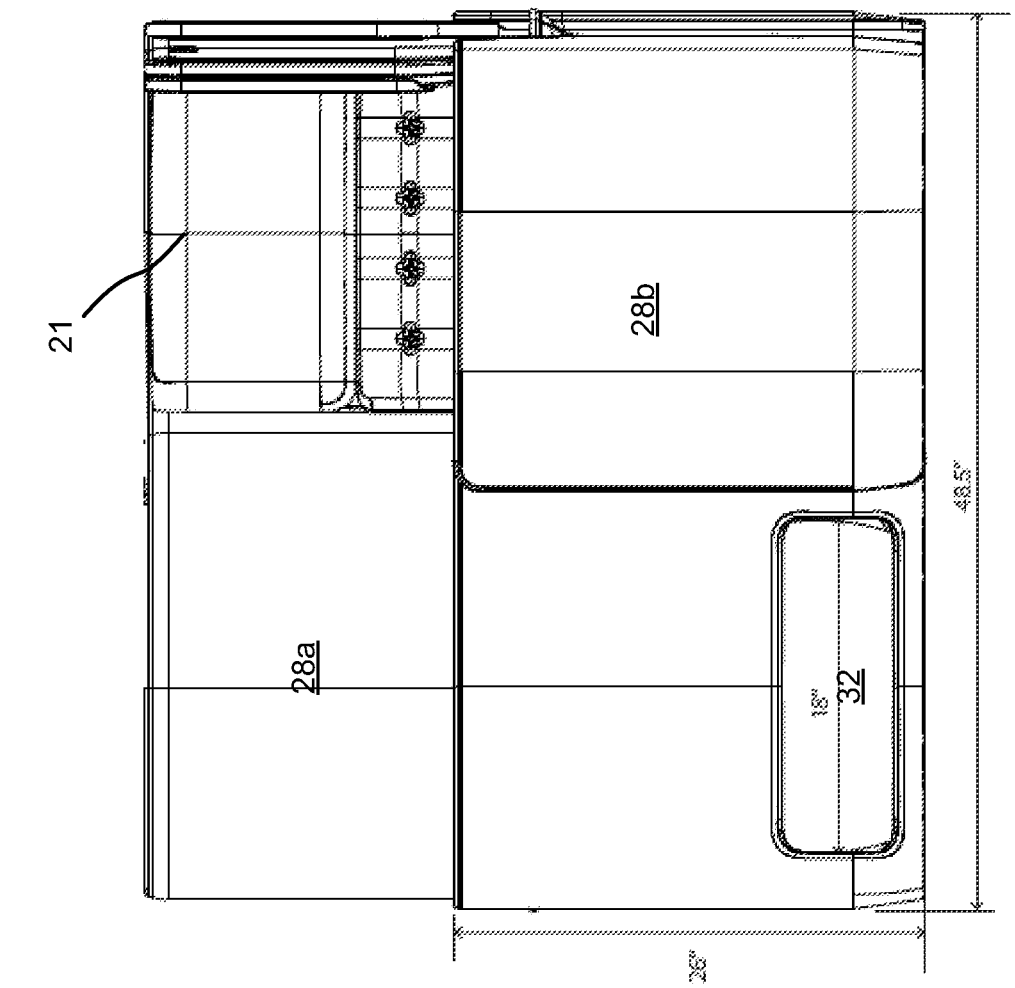

As best shown in the FIG. 15a, the inner wall of the first housing 28a preferably extends in a substantially straight line along the boundary line B up to the forward end of the console table 34, so that the inner walls of the first housings 28a of the pair of seating arrangements overlap along the boundary line B. The degree of overlap between the inner walls may be adjusted by changing the fixing positions of the first housings 28a, and the corresponding seats 20, on the floor panels. In this way, the length and width of a pair of seating arrangements may be adjusted, for example to suit the cabin layout for particular aircraft or passenger requirements.

Figure 16:
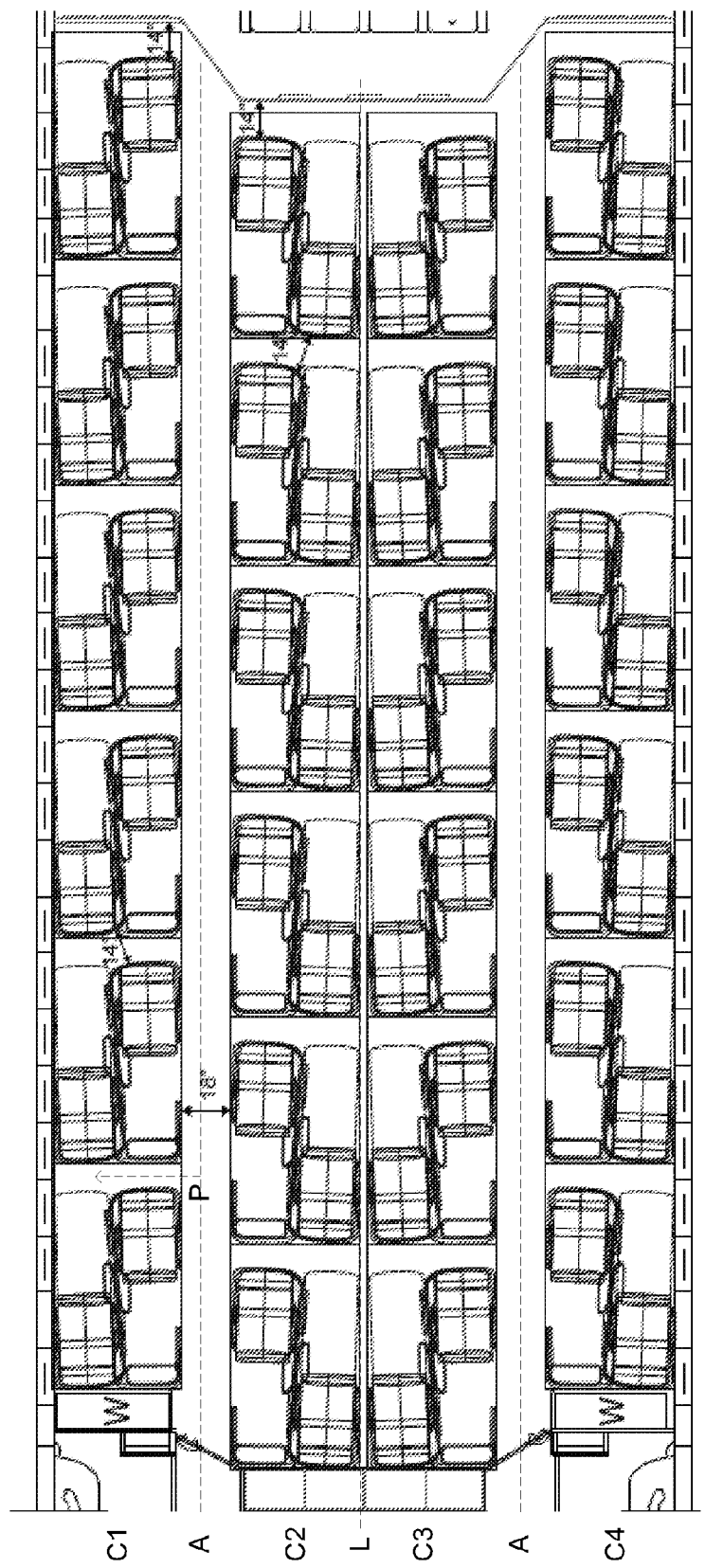
FIG. 16 is a plan view of a passenger cabin layout comprising seating arrangements of the seventh configuration.
Figure 16A:
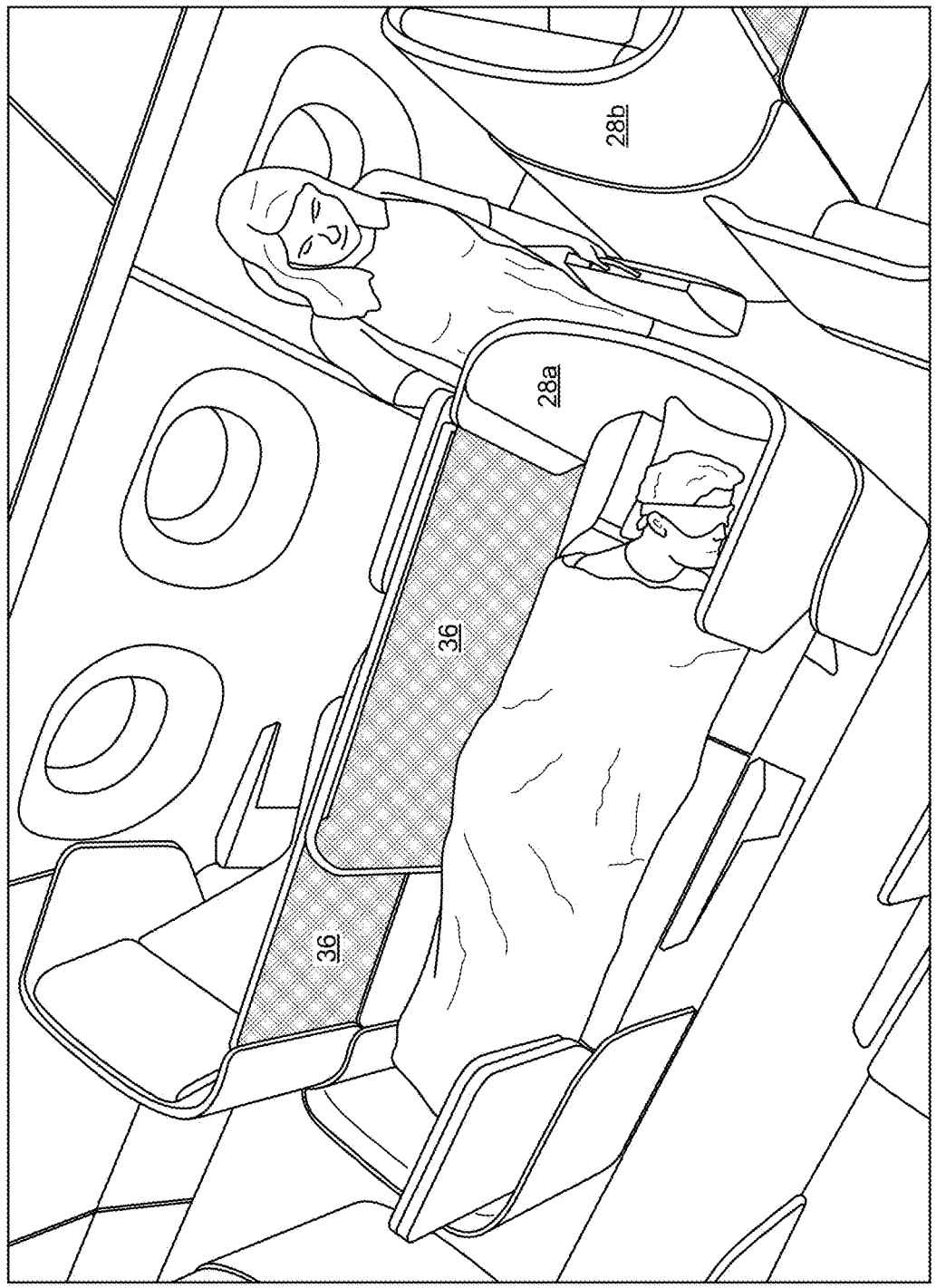
FIG. 16a is a perspective view of a pair of seating arrangements according to the seventh configuration, illustrating the ability of a passenger seated away from an aisle to access the aisle without stepping within the other seating arrangement of the pair.

FIG. 16 shows a sample layout of seating arrangements of the seventh configuration, in an aircraft cabin. In this example, the aircraft cabin is for a Boeing B777® passenger aircraft. Four columns C1-C4 of seating arrangements extend parallel to the longitudinal axis of the cabin. The outer columns C1 and C4 are arranged along the cabin side walls, and the two centre columns C2 and C3 are arranged adjacent to each other along the central longitudinal axis of the cabin. An aisle A is provided between the columns C1 and C2, and between the columns C3 and C4. In each pair of seating arrangements, the seat 20 further from the aisle A is accessible between the first housing 28a of one seating arrangement and the second housing 28b of a longitudinally adjacent seating arrangement, for example along the path P, so that the passenger for that seat does not need to step within any seating arrangement nearer the aisle. This provides greater privacy for passengers seated towards the aisle, and avoids trapping the passenger seated away from the aisle when the seat towards the aisle is in the bed configuration, as illustrated in FIG. 17c.

In the sample layout, 48 seating arrangements are provided in the cabin section as shown. This is the same number of seating arrangements that could be provided in the same cabin section using the applicant's current 'Club World' seating arrangements, as disclosed for example in the applicant's patent publication WO-A-2007/072045, which is generally viewed as one of the most efficient seating configurations in its use of space. However, the seventh configuration provides an advantage of not requiring passengers to step over other seating arrangements to reach their own seat 20. A similar advantage can be seen when applying the seventh configuration to cabin sections for other aircraft.

Figure 17A:
FIG. 17a is a perspective view of two pairs of seating arrangements according to the seventh configuration, with privacy screens retracted.
Figure 17B:
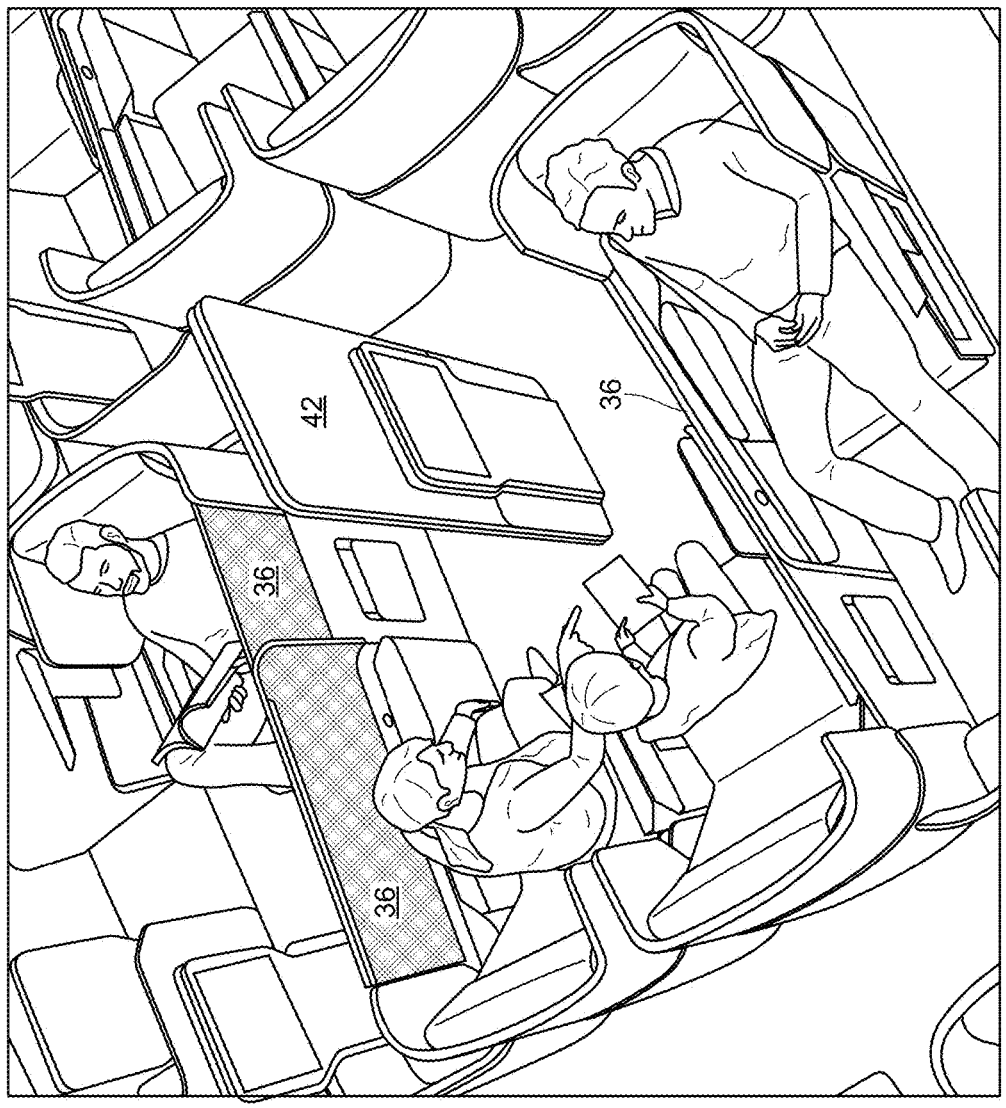
FIG. 17b is a perspective view of two pairs of seating arrangements according to the seventh configuration, with one set of privacy screens raised.
Figure 18A:
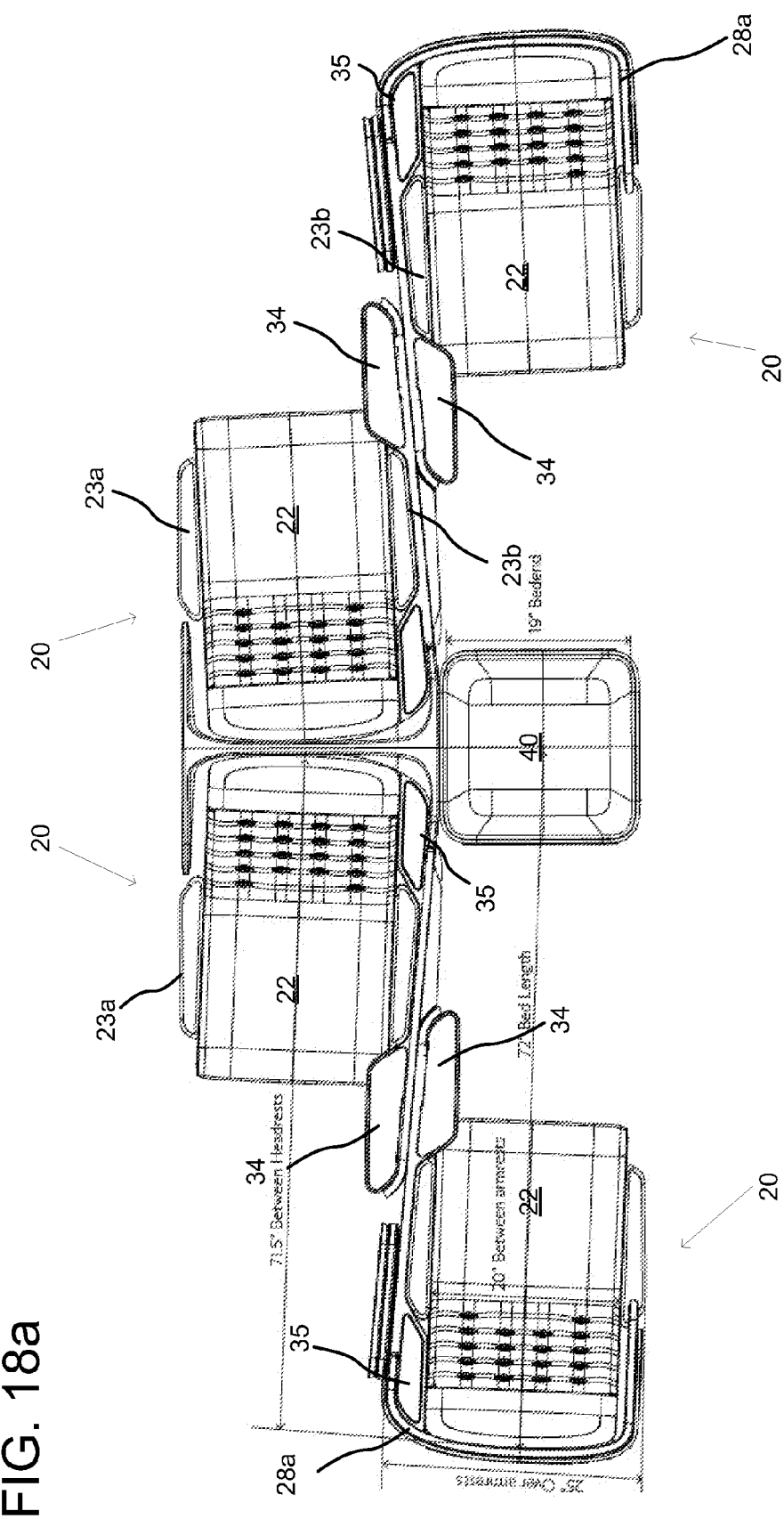
FIGS. 18a to 18d are respectively plan, perspective, side and end views of a seating arrangement according to an eighth seat configuration.
Figure 18B:
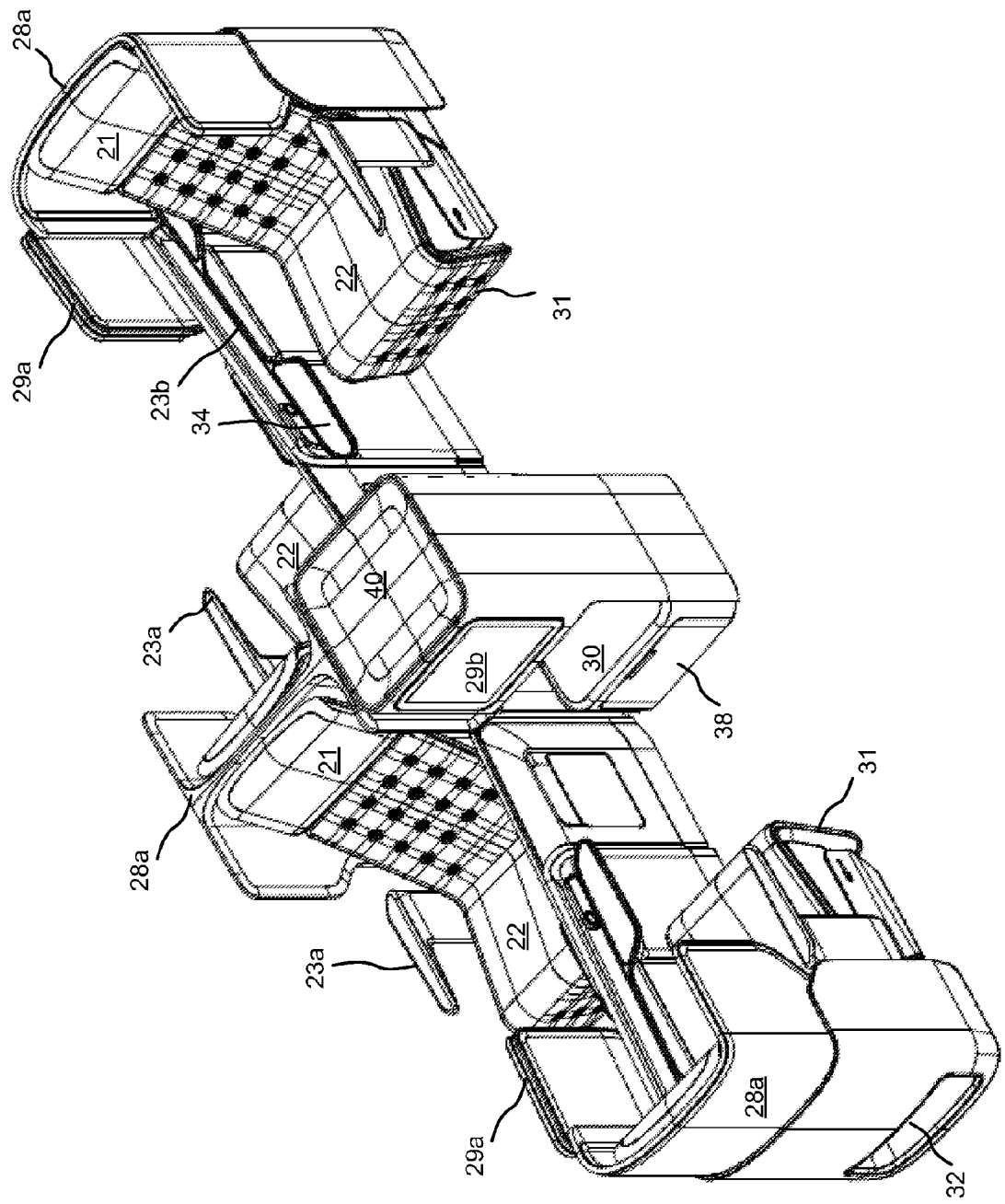
Figure 18C:
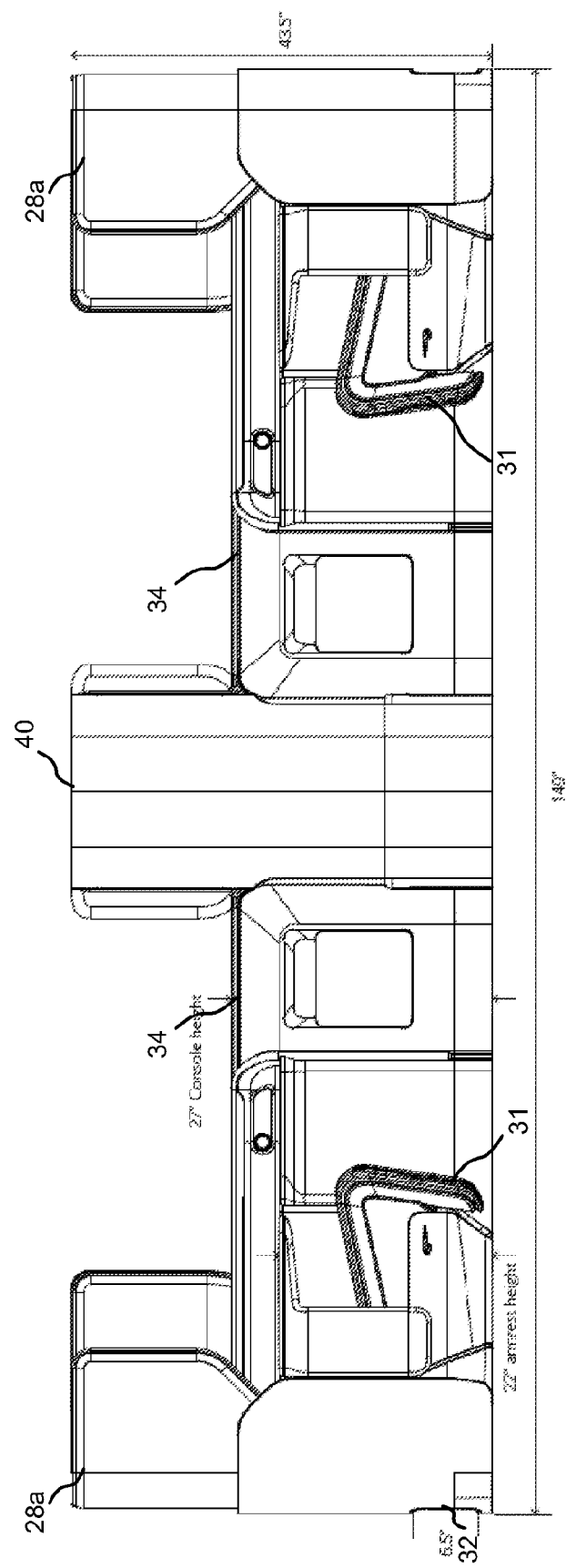
Figure 18D:
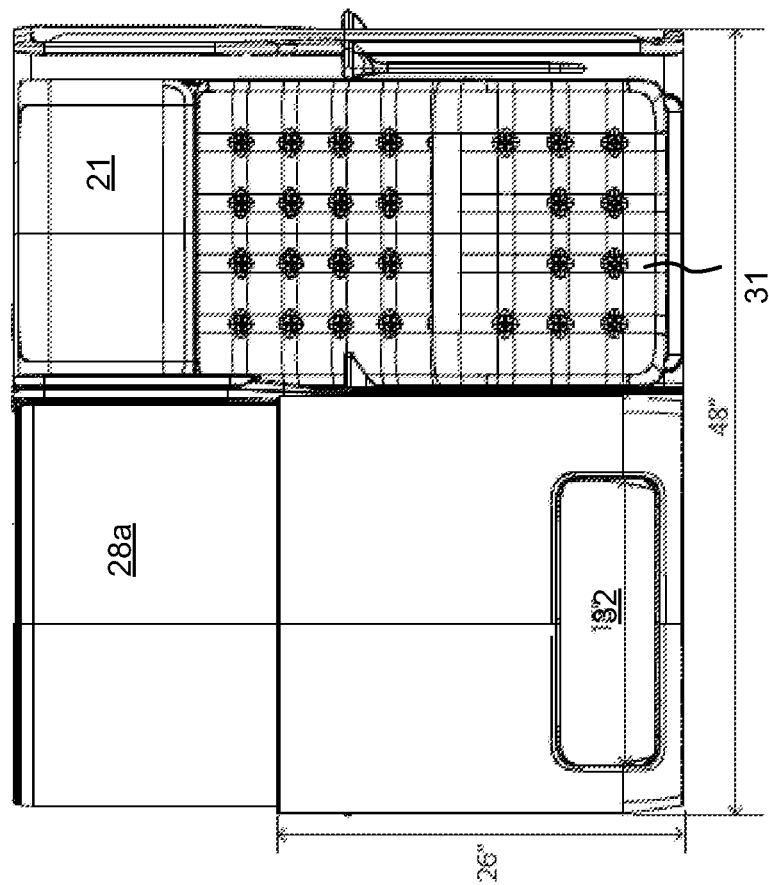

As shown in FIG. 17a, a dividing screen 42 between the central columns C2, C3 may be pushed back or stowed, and the privacy screen(s) 36 between a pair of forward and backward seats may be retracted, to form a group of four seats with line of sight between adjacent seats, suitable for a family or other group travelling together. As shown in FIG. 17b, the privacy screens 36 of a pair of forward and backward seats may be raised, to form a group of three seats with line of sight between adjacent seats, and a fourth seat that is screened from this group.

In the seventh configuration as shown, the dimensions are as follows:
Width over armrests (23a, 23b): 25 in (64 cm)
Distance between armrests (23a, 23b): 20 in (51 cm)
Width of bed end (i.e. usable width of foot rest 30): 19 in (48 cm)

The eighth configuration, as shown in FIGS. 18a to 18d, 19 and 20, comprises two pairs of forward and backward facing seats 20; each pair is similar to the seventh configuration, but alternate seats 20 along the longitudinal direction face in opposite directions. Hence, the seats 20 in each column are arranged alternately back-to-back and facing each other. Each pair of forward and backward facing seats 20 may be fixed on the same floor panel 4, or both pairs may be fixed to the same floor panel 4.

A divider is positioned between seats 20 facing each other along the same longitudinal line. In the case of pairs of seats 20 adjacent the aisle, the divider comprises a tower or monument 40 comprising, on each side facing one of the seats 20, a foot rest 30, a storage drawer or compartment 38 under or within the foot rest 30, and an IFE unit 29b above the foot rest 30. The top surface of the monument 40 forms a tray or shelf, from which meals, snacks or drinks may be served. Hence, the monument 40 provides multiple different functions within the same footprint.

In the case of oppositely facing seats 20 along the same longitudinal line and away from the aisle A, the divider comprises a dividing screen 42. Passengers accessing the oppositely facing seats may pass to either side of the dividing screen 42, along paths P1 and P2 respectively, as shown in FIG. 19.

Figure 19:
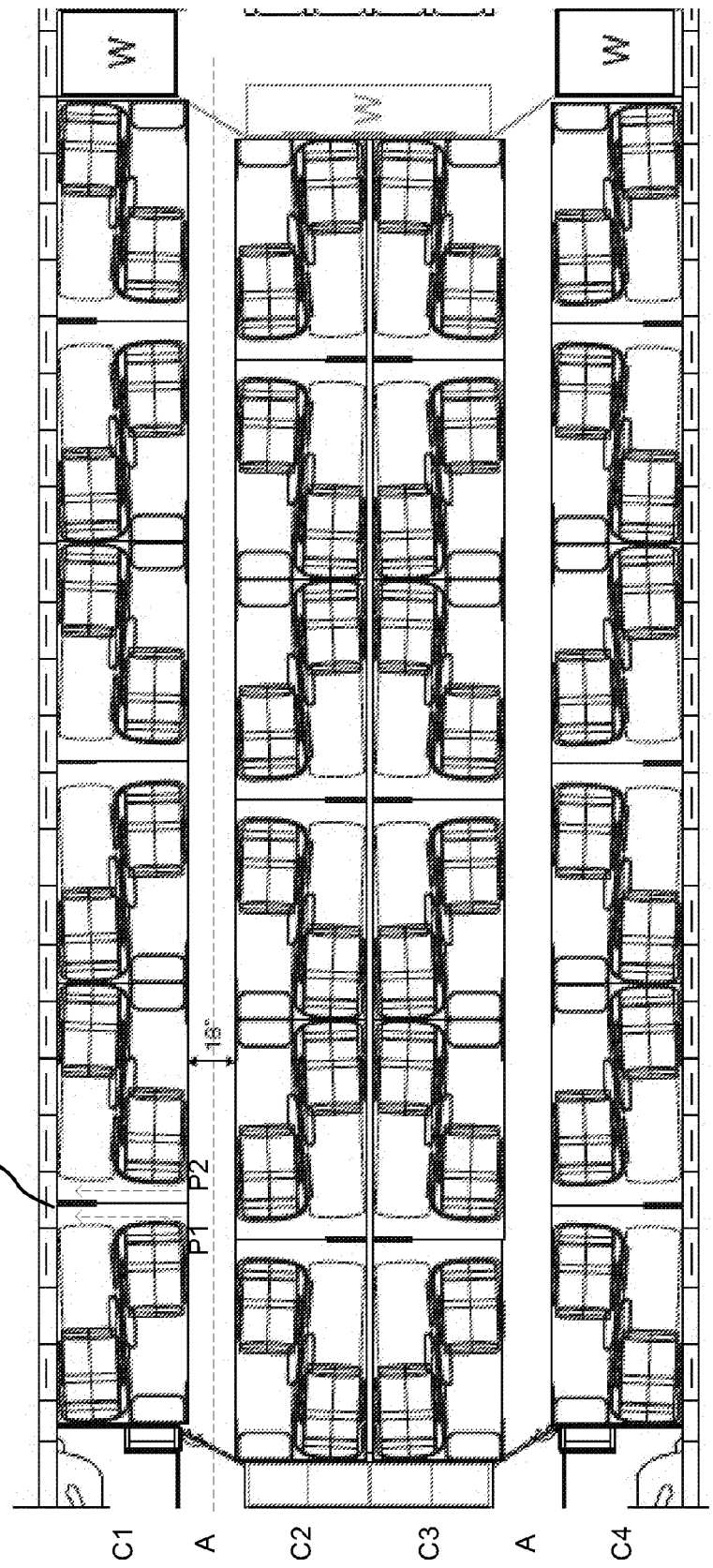
FIG. 19 is a plan view of a passenger cabin layout comprising seating arrangements of the eighth configuration.

FIG. 19 shows a sample layout of seating arrangements of the eighth configuration, in an aircraft cabin similar to that of FIG. 16. As in the layout of the seventh configuration, the same number of seating arrangements is provided as is possible in the same cabin section using the applicant's current 'Club World' seating arrangements, but passengers seated away from the aisle A are not required to step within the seating arrangement of another passenger adjacent the aisle A.

Figure 20:
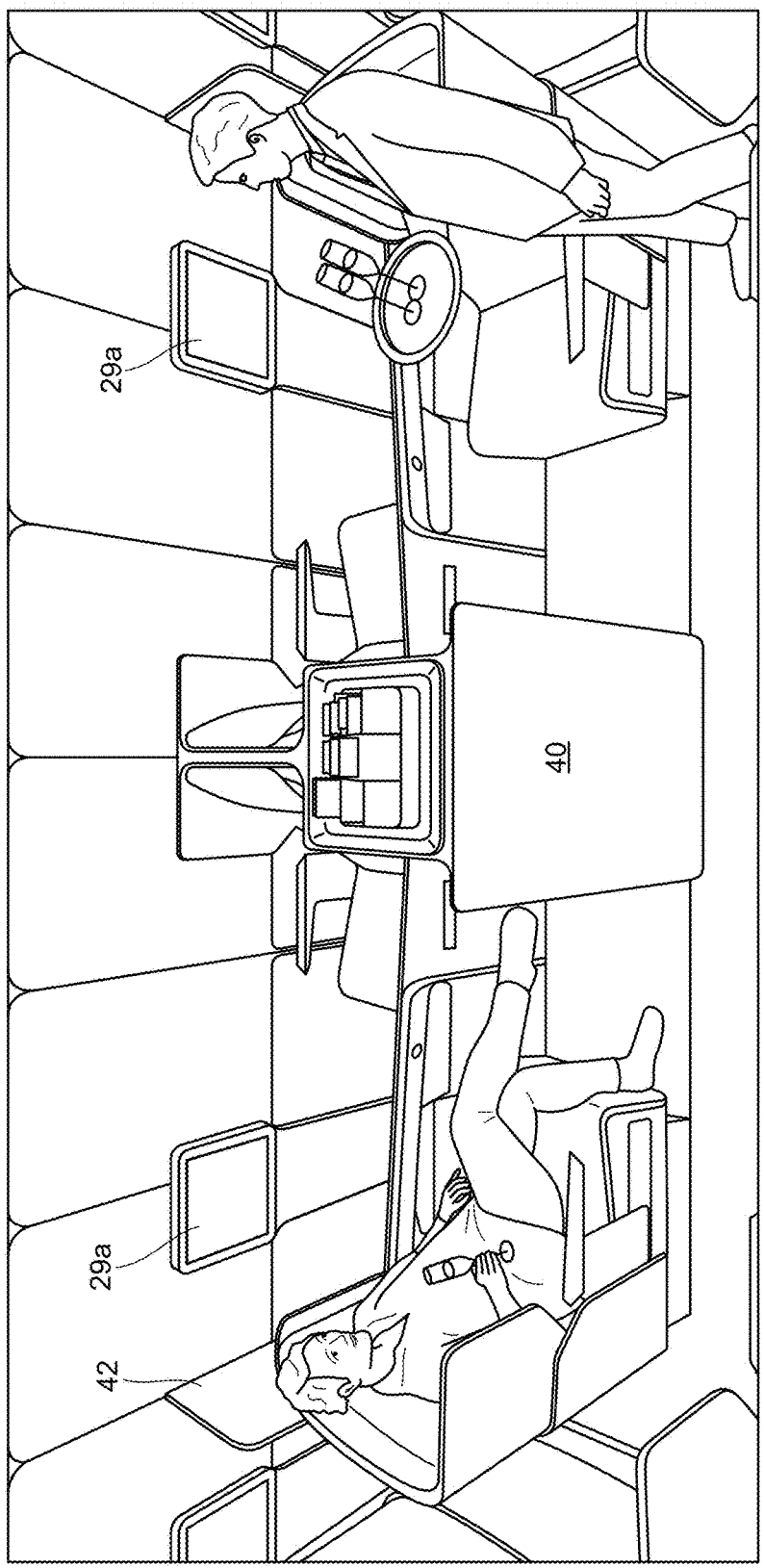
FIG. 20 is a perspective view of two pairs of seating arrangements according to the eighth configuration.

FIG. 20 is a perspective view of the one of the outer columns C1, C4 of the sample layout of seating arrangements of the eighth configuration. The IFE units 29a of the seating arrangements adjacent the cabin sidewall are mounted against the cabin sidewall and the screen is able to pivot to face the seat 20.

In the eighth configuration as shown, the dimensions are as follows:
Bed length (end of seat back 21 in bed position to end of foot rest 30): 72 in (1.83 cm)
Width over armrests (23a, 23b): 25 in (64 cm)
Distance between armrests (23a, 23b): 20 in (51 cm)
Width of bed end (i.e. usable width of foot rest 30): 19 in (48 cm)

Multiple Configurations

Figure 21:
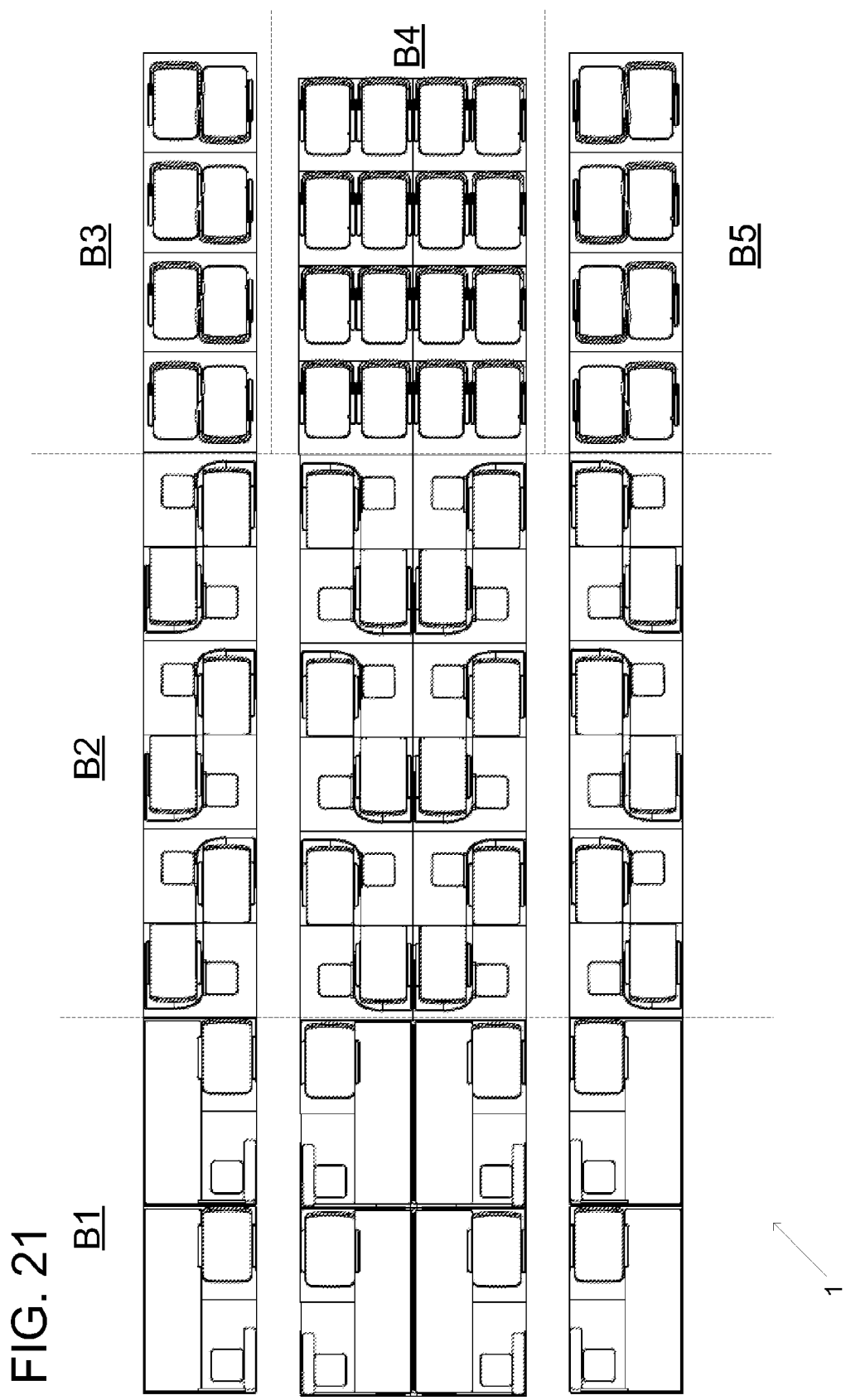
FIG. 21 is a plan view of a sample passenger cabin layout comprising a plurality of seating arrangements according to different configurations.

Different configurations of seating arrangement may be combined in the same deck section 1, and even in the same longitudinal block extending across the deck section 1. For example, as shown in FIG. 21, a first longitudinal block B1 may comprise a plurality of seating arrangements according to the sixth configuration, a second longitudinal block B2 may comprise seating arrangements according to the fourth configuration, and a third longitudinal block may be divided laterally into three sections B3, B4 and B5, the outer sections B3 and B5 each comprising a plurality of seats according to the third configuration, and the central section B4 comprising a plurality of seats according to the first configuration.

In this example, each of the seating arrangements in blocks B1 and B2 has a footprint of the same shape and size, so that it is possible to replace any of these seating arrangements with another seating arrangement having the same footprint, without requiring any changes to other seating arrangements, at least within the same block. For example, the laterally outmost seating arrangements in block B could be replaced with seating arrangements according to the sixth configuration.

Furthermore, the seating arrangements in blocks B3 and B5 have a footprint one half the size of the seating arrangements in blocks B1 and B2. Therefore, a pair of seating arrangements according to the third configuration in blocks B3 and B5 can be replaced by a single seating arrangement according to the sixth or fourth configuration, for example.

Common Components

Different ones of the above configurations may share similar seats 20 or seat components, such as the privacy housing sections 28, IFE units 29 and foot rests 30. As a result of the flexibility of configuration provided by the fixing arrangements, different configurations may be achieved by reconfiguring the same seats 20 and seat components. Additionally, development costs may be reduced because it is no longer necessary to develop a new set of components for each seat configuration. Moreover, each seat or seat component that is removably fixed directly to a floor panel 4 needs only be tested once, for example using the 9 g or 16 g tests applicable to aircraft cabin seating, rather than re-tested in each configuration.

ALTERNATIVE EMBODIMENTS

Alternative embodiments of the invention may be apparent from reading the above description. Such alternative embodiments may nevertheless fall within the scope of the present invention.

The invention claimed is:

1. An array of passenger seating arrangements in or for an aircraft cabin, the seating arrangements being arranged in laterally adjacent pairs facing in mutually opposite directions generally parallel to a longitudinal direction of the aircraft cabin, each pair comprising a first seating arrangement located adjacent an aisle and a second seating arrangement located past the first seating arrangement from the aisle, each said first seating arrangement comprising a first housing arranged behind a seat, and a second housing arranged around a foot rest forward of the seat;
   wherein each said seat is convertible between a substantially upright seating position and a substantially flat, horizontal bed position extending generally in the direction in which the seating arrangement faces;
   wherein the foot rest of the first seating arrangement forms part of a flat horizontal bed in the flat, horizontal bed position;
   wherein the second seating arrangement is accessible by a passenger from the aisle along a path between the first housing of the first seating arrangement of the pair and the second housing of a first seating arrangement of an adjacent pair, without stepping between the seat and the foot rest of the first seating arrangement;
   wherein each of the seating arrangements of the pair comprises a seat portion around a seat and a forward portion forward of the seat, wherein the seat portion is wider than the forward portion; and
   wherein the seating arrangements of the pair are aligned such that the seat portion of one of the seating arrangements of the pair is laterally adjacent to the forward portion of the other one of the seating arrangements of the pair.

2. The array of claim 1, wherein the forward portion of the first seating arrangement includes the foot rest.

3. The array of claim 1, wherein a boundary wall between the seating arrangements of the pair is angled relative to the longitudinal direction.

4. The array of claim 3, wherein the angle between the boundary wall and the longitudinal direction is between 1 and 3°.

5. The array of claim 4, wherein the angle between the boundary wall and the longitudinal direction is approximately or exactly 2°.

6. The array of claim 3, wherein the boundary wall extends along a substantially straight line.

7. The array of claim 3, wherein a retractable privacy screen is provided along at least part of the boundary wall.

8. The array of claim 3, wherein the boundary wall comprises a first portion extending along the seat portion of one seating arrangement of the pair and a second portion extending along the seat portion of the other seating arrangement of the pair.

9. The array of claim 8, wherein the first and second portions are configurable to vary a length of the boundary wall.

10. The array of claim 1, wherein each pair is provided on one floor panel.

11. An aircraft cabin deck section comprising the array of claim 1.

12. The cabin deck section of claim 11, wherein the array comprises four columns of said pairs of seating arrangements extending parallel to the longitudinal direction, outer ones of the columns being arranged along side walls of the cabin section and two centre ones of the columns being arranged adjacent to each other, with an aisle provided on either side of the two centre columns.

* * * * *